US011990659B2

(12) United States Patent
Li et al.

(10) Patent No.: US 11,990,659 B2
(45) Date of Patent: May 21, 2024

(54) Fe-Cr REDOX FLOW BATTERY SYSTEMS AND METHODS FOR PREPARATION OF CHROMIUM-CONTAINING ELECTROLYTE THEREFOR

(71) Applicant: COUGAR CREEK TECHNOLOGIES, LLC, Kirkland, WA (US)

(72) Inventors: Liyu Li, Bellevue, WA (US); Qingtao Luo, Mukilteo, WA (US)

(73) Assignee: COUGAR CREEK TECHNOLOGIES, LLC, Kirkland, WA (US)

( * ) Notice: Subject to any disclaimer, the term of this patent is extended or adjusted under 35 U.S.C. 154(b) by 583 days.

(21) Appl. No.: 17/362,499

(22) Filed: Jun. 29, 2021

(65) Prior Publication Data

US 2022/0158211 A1 May 19, 2022

Related U.S. Application Data

(60) Provisional application No. 63/174,352, filed on Apr. 13, 2021, provisional application No. 63/154,547, (Continued)

(51) Int. Cl.
*H01M 8/08* (2016.01)
*C22C 1/00* (2023.01)
(Continued)

(52) U.S. Cl.
CPC .............. *H01M 8/188* (2013.01); *C22C 1/00* (2013.01); *C22C 27/06* (2013.01); *H01M 4/38* (2013.01);
(Continued)

(58) Field of Classification Search
None
See application file for complete search history.

(56) References Cited

U.S. PATENT DOCUMENTS 3,996,064 A  12/1976  Thaller
4,159,366 A   6/1979  Thaller
(Continued)

FOREIGN PATENT DOCUMENTS

CN  105702997 A   6/2016
CN  110117048     8/2019
(Continued)

OTHER PUBLICATIONS

Johnson and Reid, "Chemical and Electrochemical Behavior of the Cr(III)/Cr(II) Half-Cell in the Iron-Chromium Redox Energy Storage System," J. Electrochem. Soc.: Electrochemical Science and Technology; vol. 132, No. 5; May 1985; pp. 1058-1062.
(Continued)

*Primary Examiner* — Lucas J. O'Donnell
(74) *Attorney, Agent, or Firm* — Branch Partners PLLC; Bruce E. Black

(57) ABSTRACT

A method for preparation of electrolyte for a redox flow battery includes reducing chromium ore using a carbon source to convert the chromium ore to an iron/chromium alloy with carbon particles; dissolving the iron/chromium alloy with carbon particles in sulfuric acid to form a first solution; adding calcium chloride or barium chloride to the first solution to produce a second solution including $FeCl_3$ and $CrCl_3$; and adding an acid to the second solution to form the electrolyte. Other methods can be used for preparing an electrolyte from chromium waste material.

10 Claims, 16 Drawing Sheets

Related U.S. Application Data filed on Feb. 26, 2021, provisional application No. 63/147,182, filed on Feb. 8, 2021, provisional application No. 63/131,738, filed on Dec. 29, 2020, provisional application No. 63/127,048, filed on Dec. 17, 2020, provisional application No. 63/126,408, filed on Dec. 16, 2020, provisional application No. 63/120,204, filed on Dec. 2, 2020, provisional application No. 63/114,160, filed on Nov. 16, 2020.

(51) Int. Cl.
| | |
|---|---|
| *C22C 27/06* | (2006.01) |
| *H01M 4/38* | (2006.01) |
| *H01M 8/04186* | (2016.01) |
| *H01M 8/04276* | (2016.01) |
| *H01M 8/04537* | (2016.01) |
| *H01M 8/04858* | (2016.01) |
| *H01M 8/18* | (2006.01) |
| *H01M 16/00* | (2006.01) |
| *H01M 4/86* | (2006.01) |
| *H01M 8/06* | (2016.01) |

(52) U.S. Cl.
CPC ... *H01M 8/04186* (2013.01); *H01M 8/04276* (2013.01); *H01M 8/04544* (2013.01); *H01M 8/04611* (2013.01); *H01M 8/04932* (2013.01); *H01M 8/08* (2013.01); *H01M 16/003* (2013.01); *H01M 2004/8694* (2013.01); *H01M 8/0693* (2013.01); *H01M 2300/0002* (2013.01); *H01M 2300/0005* (2013.01)

(56) References Cited

U.S. PATENT DOCUMENTS

| | | | |
|---|---|---|---|
| 4,192,910 A | 3/1980 | Giner et al. | |
| 4,270,984 A | 6/1981 | Giner et al. | |
| 4,454,649 A | 6/1984 | Jalan et al. | |
| 4,485,154 A | 11/1984 | Remick et al. | |
| 4,543,302 A | 9/1985 | Gahn et al. | |
| 4,576,878 A | 3/1986 | Gahn | |
| 4,732,827 A * | 3/1988 | Kaneko | H01M 8/188 |
| | | | 75/416 |
| 4,786,567 A | 11/1988 | Skyllas-Kazacos et al. | |
| 4,814,241 A | 3/1989 | Nagashima et al. | |
| 4,874,483 A | 10/1989 | Wakabayashi et al. | |
| 4,882,241 A | 11/1989 | Heinzel | |
| 4,956,244 A | 9/1990 | Shimizu et al. | |
| 7,320,844 B2 | 1/2008 | Skyllas-Kazacos | |
| 7,820,312 B2 | 10/2010 | Eickhoff | |
| 7,855,005 B2 | 12/2010 | Sahu | |
| 7,919,204 B2 | 4/2011 | Sahu | |
| 7,927,731 B2 | 4/2011 | Sahu | |
| 7,976,974 B2 | 7/2011 | Kazacos et al. | |
| 8,230,736 B2 | 7/2012 | Sahu et al. | |
| 8,236,463 B2 | 8/2012 | Sahu et al. | |
| 8,264,202 B2 | 9/2012 | Sahu et al. | |
| 8,338,008 B2 | 12/2012 | Zu et al. | |
| 8,349,477 B2 | 1/2013 | Parakulam et al. | |
| 8,394,529 B2 | 3/2013 | Keshavarz et al. | |
| 8,535,821 B2 | 9/2013 | Parakulam et al. | |
| 8,541,121 B2 | 9/2013 | Keshavarz et al. | |
| 8,551,299 B2 | 10/2013 | Keshavarz et al. | |
| 8,587,150 B2 | 11/2013 | Parakulam | |
| 8,587,255 B2 | 11/2013 | Parakulam et al. | |
| 8,609,270 B2 | 12/2013 | Xia et al. | |
| 8,628,880 B2 | 1/2014 | Li et al. | |
| 8,771,856 B2 | 7/2014 | Li et al. | |
| 8,785,023 B2 | 7/2014 | Horne et al. | |
| 8,852,777 B2 | 10/2014 | Keshavarz et al. | |
| 8,877,365 B2 | 11/2014 | Keshavarz et al. | |
| 8,906,529 B2 | 12/2014 | Horne et al. | |
| 8,916,281 B2 | 12/2014 | Chang et al. | |
| 8,951,665 B2 | 2/2015 | Keshavarz et al. | |
| 8,980,454 B2 | 3/2015 | Pham et al. | |
| 8,980,484 B2 | 3/2015 | Chang et al. | |
| 8,993,183 B2 | 3/2015 | Pham et al. | |
| 9,077,011 B2 | 7/2015 | Li et al. | |
| 9,106,980 B2 | 8/2015 | Parakulam et al. | |
| 9,123,931 B2 | 9/2015 | Li et al. | |
| 9,130,218 B2 | 9/2015 | Wang et al. | |
| 9,153,832 B2 | 10/2015 | Li et al. | |
| 9,257,710 B2 | 2/2016 | Keshavarz et al. | |
| 9,368,824 B2 | 6/2016 | Xia et al. | |
| 9,722,264 B2 | 8/2017 | Li et al. | |
| 9,819,039 B2 | 11/2017 | Li et al. | |
| 9,846,116 B2 | 12/2017 | Li et al. | |
| 9,941,527 B2 | 4/2018 | Li et al. | |
| 9,960,443 B2 | 5/2018 | Wang et al. | |
| 10,044,058 B2 | 8/2018 | Darling et al. | |
| 10,135,087 B2 | 11/2018 | Sun et al. | |
| 10,333,159 B2 | 6/2019 | Li et al. | |
| 10,424,797 B2 | 9/2019 | Zhang et al. | |
| 10,777,836 B1 | 9/2020 | Wei et al. | |
| 10,826,102 B1 | 11/2020 | Wei et al. | |
| 11,189,855 B1 | 11/2021 | O'Neill et al. | |
| 2002/0108910 A1 | 8/2002 | Lyon | |
| 2008/0292964 A1 | 11/2008 | Kazacos et al. | |
| 2010/0003586 A1 | 1/2010 | Sahu | |
| 2011/0070483 A1 | 3/2011 | Keshavarz et al. | |
| 2011/0076526 A1 | 3/2011 | Zu et al. | |
| 2011/0086247 A1 | 4/2011 | Keshavarz et al. | |
| 2013/0095362 A1 | 4/2013 | Keshavarz et al. | |
| 2013/0330644 A1 | 12/2013 | Brandon et al. | |
| 2014/0027301 A1 | 1/2014 | Botte | |
| 2014/0272483 A1 | 9/2014 | Pham et al. | |
| 2016/0006051 A1 | 1/2016 | Winter et al. | |
| 2016/0248109 A1 | 8/2016 | Esswein et al. | |
| 2016/0308234 A1 | 10/2016 | Reece et al. | |
| 2016/0315339 A1 | 10/2016 | Darling et al. | |
| 2017/0229728 A1 | 8/2017 | Dong et al. | |
| 2017/0317363 A1 | 11/2017 | Pijpers | |
| 2018/0011143 A1 | 1/2018 | Bruch et al. | |
| 2018/0072669 A1 | 3/2018 | Liu et al. | |
| 2018/0102561 A1 | 4/2018 | Sullivan | |
| 2018/0277868 A1 | 9/2018 | Loretz et al. | |
| 2018/0316033 A1 | 11/2018 | Evans | |
| 2019/0240623 A1 | 8/2019 | Beh et al. | |
| 2019/0326619 A1 | 10/2019 | Winter et al. | |
| 2020/0006796 A1 | 1/2020 | Su et al. | |
| 2020/0014040 A1 | 1/2020 | Kerker et al. | |
| 2020/0014054 A1 | 1/2020 | Norman et al. | |
| 2020/0052310 A1 | 2/2020 | Song et al. | |
| 2020/0373594 A1 | 11/2020 | Wei et al. | |
| 2020/0373595 A1 | 11/2020 | Wei et al. | |
| 2020/0373600 A1 | 11/2020 | Wei et al. | |
| 2020/0373601 A1 | 11/2020 | Wei et al. | |
| 2020/0373602 A1 | 11/2020 | Wei et al. | |
| 2020/0400614 A1 | 12/2020 | Deng et al. | |

FOREIGN PATENT DOCUMENTS

| | | |
|---|---|---|
| KR | 20140046772 A | 4/2014 |
| WO | 2016/018165 | 2/2016 |
| WO | 2020/191330 | 9/2020 |

OTHER PUBLICATIONS

Norman H. Hagedorn, "NASA Redox Storage System Development Project," Final Report Prepared for U.S. Department of Energy Conservation and Renewable Energy Division of Energy Storage Systems, Oct. 1984, 46 pages.

Official Communication for U.S. Appl. No. 17/362,543 mailed Aug. 7, 2023.

Official Communication for U.S. Appl. No. 18/110,232 mailed Apr. 26, 2023.

Official Communication for U.S. Appl. No. 17/362,610 mailed Jan. 30, 2023.

Official Communication for U.S. Appl. No. 17/362,468 mailed Feb. 17, 2023.

(56) References Cited

OTHER PUBLICATIONS

International Search Report and Written Opinion for PCT Application No. PCT/US2021/058603 mailed Mar. 16, 2022.
Invitation to Pay Additional Fees and, Where Applicable, Protest Fee for PCT Application No. PCT/US2021/058603 mailed Jan. 13, 2022.
Official Communication for U.S. Appl. No. 17/362,521 mailed Mar. 14, 2024.

* cited by examiner

US 11,990,659 B2

Fe-Cr REDOX FLOW BATTERY SYSTEMS AND METHODS FOR PREPARATION OF CHROMIUM-CONTAINING ELECTROLYTE THEREFOR

RELATED PATENT APPLICATIONS

The present patent application claims the benefit of U.S. Provisional Patent Application Ser. Nos. 63/120,204; 63/126,408; 63/127,048; 63/131,738; 63/147,182; 63/154,547; 63/174,352; and 63/114,160, all of which are incorporated herein by reference in their entireties.

FIELD

The present invention is directed to the area of redox flow battery systems and methods of making and using redox flow battery systems. The present invention is also directed to iron-chromium (Fe—Cr) redox flow battery systems and methods for preparing chromium-containing electrolytes for the systems.

BACKGROUND

The cost of renewable power generation has reduced rapidly in the past decade and continues to decrease as more renewable power generation elements, such as solar panels, are deployed. However, renewable power sources, such as solar, hydroelectric, and wind sources, are often intermittent and the pattern of user load does not typically coincide with the intermittent nature of the sources. There is a need for an affordable and reliable energy storage system to store power generated by renewable power sources when available and to provide power to users when there is insufficient power generation from the renewable power sources.

BRIEF SUMMARY

One embodiment is a method for preparation of electrolyte for a redox flow battery. The method includes reducing chromium ore using a carbon source to convert the chromium ore to an iron/chromium alloy with carbon particles; dissolving the iron/chromium alloy with carbon particles in sulfuric acid to form a first solution; adding calcium chloride or barium chloride to the first solution to produce a second solution including $FeCl_3$ and $CrCl_3$; and adding an acid to the second solution to form the electrolyte.

In at least some embodiments, the chromium ore includes at least one metal impurity and the method further includes reducing the at least one metal impurity in the electrolyte using an electrode of the redox flow battery to form particles of the at least one metal impurity; collecting the particles of the at least one metal impurity; and removing the collected particles using a cleaning solution. In at least some embodiments, collecting the particles includes collecting at least a portion of the particles on an electrode of the redox flow battery system. In at least some embodiments, the electrode includes interdigitated openings or indentations for collection of the particles. In at least some embodiments, the at least one metal impurity includes at least one of nickel, antimony, bismuth, zinc, platinum, palladium, gold, or copper. In at least some embodiments, the cleaning solution includes ferric ions. In at least some embodiments, the cleaning solution is at least a portion of a catholyte of the redox flow battery system. In at least some embodiments, the cleaning solution includes hydrogen peroxide or ferric chloride.

In at least some embodiments, the carbon source includes graphite, activated carbon, coal, charcoal, or carbon monoxide gas. In at least some embodiments, the method further includes adding $FeCl_3$ or $CrCl_3$ to obtain a preselected ratio of $FeCl_3/CrCl_3$ in the electrolyte.

Another embodiment is a method for preparation of electrolyte for a redox flow battery. The method includes dissolving chromium waste material in HCl or $H_2SO_4$ to generate an electrolyte including $CrCl_3$ or $Cr_2(SO_4)_3$ and at least one metal impurity, respectively; reducing the at least one metal impurity in the electrolyte using an electrode of the redox flow battery to form particles of the at least one metal impurity; collecting the particles of the at least one metal impurity; and removing the collected particles using a cleaning solution.

In at least some embodiments, collecting the particles includes collecting at least a portion of the particles on an electrode of the redox flow battery system. In at least some embodiments, the electrode includes interdigitated openings or indentations for collection of the particles. In at least some embodiments, the at least one metal impurity includes at least one of nickel, antimony, bismuth, zinc, platinum, palladium, gold, or copper.

In at least some embodiments, the cleaning solution includes ferric ions. In at least some embodiments, the cleaning solution is at least a portion of a catholyte of the redox flow battery system. In at least some embodiments, the cleaning solution includes hydrogen peroxide or ferric chloride.

In at least some embodiments, the method further includes adding $FeCl_2$, $Fe+FeCl_3$, $Fe(OH)_2$, or $Fe+Fe(OH)_3$ to obtain a preselected ratio of $FeCl_3/CrCl_3$ in the electrolyte. In at least some embodiments, the chromium waste includes $Cr(OH)_3$.

Yet another embodiments is a method for hydrogen gas production. The method includes providing a redox flow battery, including an anolyte including chromium ions in solution, a catholyte including iron ions in solution, a first half-cell including a first electrode in contact with the anolyte, a second half-cell including a second electrode in contact with the catholyte, and a first separator separating the first half-cell from the second half-cell; coupling an electrolysis cell to the redox flow battery, the electrolysis cell including third and fourth electrodes and water; discharging the redox flow battery into the electrolysis cell to produce hydrogen gas by electrolysis of the water in the electrolysis cell; removing the hydrogen gas from the electrolysis cell; and storing the hydrogen gas in a container.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to the area of redox flow battery systems and methods of making and using redox flow battery systems. The present invention is also directed to iron-chromium (Fe—Cr) redox flow battery systems and methods for preparing chromium-containing electrolytes for the systems.

Redox flow battery systems are a promising technology for the storage of energy generated by renewable energy sources, such as solar, wind, and hydroelectric sources, as well as non-renewable and other energy sources. As described herein, in at least some embodiments, a redox flow battery system can have one or more of the following properties: long life; reusable energy storage; or tunable power and storage capacity.

Figure 1:
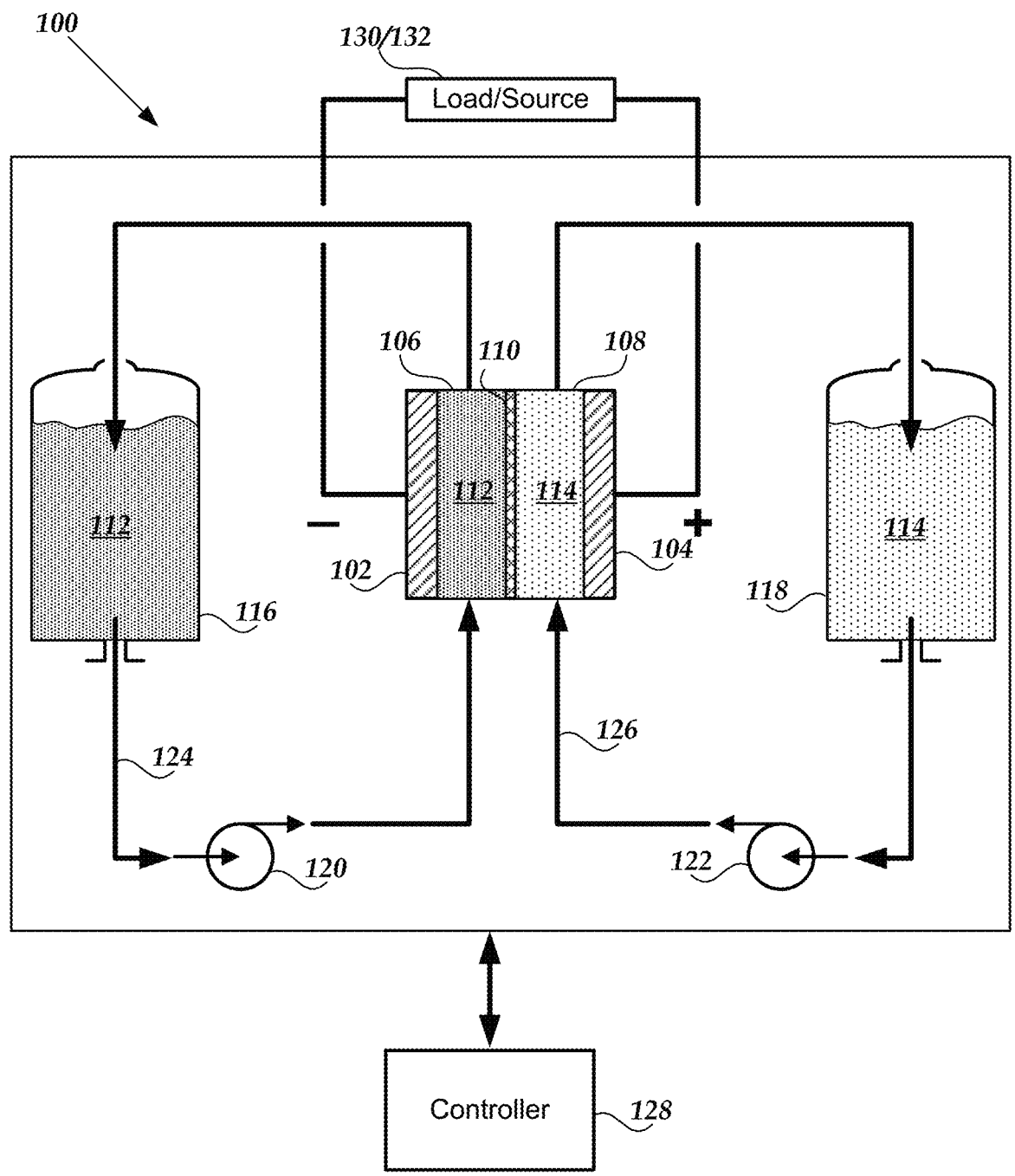
FIG. 1 is a schematic diagram of one embodiment of a redox flow battery system, according to the invention.

FIG. 1 illustrates one embodiment of a redox flow battery system 100. It will be recognized that other redox flow battery systems 100 may include more or fewer elements and the elements may be arranged differently than shown in the illustrated embodiments. It will also be recognized that the description below of components, methods, systems, and the like can be adapted to other redox flow battery systems different from the illustrated embodiments.

The redox flow battery system 100 of FIG. 1 includes two electrodes 102, 104 and associated half-cells 106, 108 that are separated by a separator 110. The electrodes 102, 104 can be in contact or separated from the separator. Electrolyte solutions flow through the half-cells 106, 108 and are referred to as the anolyte 112 and the catholyte 114. The redox flow battery system 100 further includes an anolyte tank 116, a catholyte tank 118, an anolyte pump 120, a catholyte pump 122, an anolyte distribution arrangement 124, and a catholyte distribution arrangement 126. The anolyte 112 is stored in the anolyte tank 116 and flows around the anolyte distribution arrangement 124 through, at least in part, action of the anolyte pump 120 to the half-cell 106. The catholyte 114 is stored in the catholyte tank 118 and flows around the catholyte distribution arrangement 126 through, at least in part, action of the catholyte pump 122 to the half-cell 108. It will be recognized that, although the illustrated embodiment of FIG. 1 includes a single one of each of the components, other embodiments can include more than one of any one or more of the illustrated components. For example, other embodiments can include multiple electrodes 102, multiple electrodes 104, multiple anolyte tanks 116, multiple catholyte tanks 118, multiple half-cells 112, or multiple half-cells 114, or any combination thereof.

The anolyte and the catholyte are electrolytes and can be the same electrolyte or can be different electrolytes. During energy flow into or out of the redox flow battery system 100, the electrolyte in one of the half-cells 106, 108 is oxidized and loses electrons and the electrolyte in the other one of the half-cells is reduced and gains electrons.

The redox flow battery system 100 can be attached to a load/source 130/132, as illustrated in FIG. 1. In a charge mode, the redox flow battery system 100 can be charged or recharged by attaching the flow battery to a source 132. The source 132 can be any power source including, but not limited to, fossil fuel power sources, nuclear power sources, other batteries or cells, and renewable power sources, such as wind, solar, or hydroelectric power sources. In a discharge mode, the redox flow battery system 100 can provide energy to a load 130. In the charge mode, the redox flow battery system 100 converts electrical energy from the source 132 into chemical potential energy. In the discharge mode, the redox flow battery system 100 converts the chemical potential energy back into electrical energy that is provided to the load 130.

The redox flow battery system 100 can also be coupled to a controller 128 that can control operation of the redox flow battery system. For example, the controller 128 may connect or disconnect the redox flow battery system 100 from the load 130 or source 132. The controller 128 may control operation of the anolyte pump 120 and catholyte pump 122. The controller 128 may control operation of valves associated with the anolyte tank 116, catholyte tank 118, anolyte distribution system 124, catholyte distribution system 126, or half-cells 106, 108. The controller 128 may be used to control general operation of the redox flow battery system 100 include switching between charge mode, discharge mode, and, optionally, a maintenance mode (or any other suitable modes of system operation.) In at least some embodiments, the controller or the redox flow battery system may control the temperature of within the half-cells or elsewhere in the system. In at least some embodiments, the temperature of the half-cells (or the system in general or portions of the system) is controlled to be no more than 65, 60, 55, or 50 degrees Celsius during operation.

In at least some embodiments, the anolyte pump 120 or catholyte pump 122 (or both) can be operated to increase or maintain the temperature of the anolyte/catholyte or the half-cells. Operation of the pumps generates heat that can be transferred, at least in part, to the anolyte or catholyte. In at least some embodiments, if the temperature of the anolyte or catholyte (or the corresponding half-cell 106, 108) falls below a pre-determined value the anolyte pump 120 or catholyte pump 122, respectively, initiates or increases operation to generate heat that is transferred, at least in part, to the anolyte or catholyte, respectively.

Any suitable controller 128 can be used including, but not limited to, one or more computers, laptop computers, servers, any other computing devices, or the like or any combination thereof and may include components such as one or more processors, one or more memories, one or more input devices, one or more display devices, and the like. The controller 128 may be coupled to the redox flow battery system through any wired or wireless connection or any combination thereof. The controller 128 (or at least a portion of the controller) may be located local to the redox flow battery system 100 or located, partially or fully, non-locally with respect to the redox flow battery system.

The electrodes 102, 104 can be made of any suitable material including, but not limited to, graphite or other carbon materials (including solid, felt, paper, or cloth electrodes made of graphite or carbon), gold, titanium, lead, or the like. The two electrodes 102, 104 can be made of the same or different materials. In at least some embodiments, the redox flow battery system 100 does not include any homogenous or metallic catalysts for the redox reaction in the anolyte or catholyte or both. This may limit the type of material that may be used for the electrodes.

The separator 110 separates the two half-cells 106, 108. In at least some embodiments, the separator 110 allows the transport of selected ions (for example, $Cl^-$, or iron or chromium ions or any combination thereof) during the charging or discharging of the redox flow battery system 100. In some embodiments, the separator 110 is a microporous membrane. Any suitable separator 110 can be used and examples of suitable separator include, but are not limited to, ion transfer membranes, anionic transfer membranes, cationic transfer membranes, microporous separators, or the like or any combination thereof.

Figure 9A:
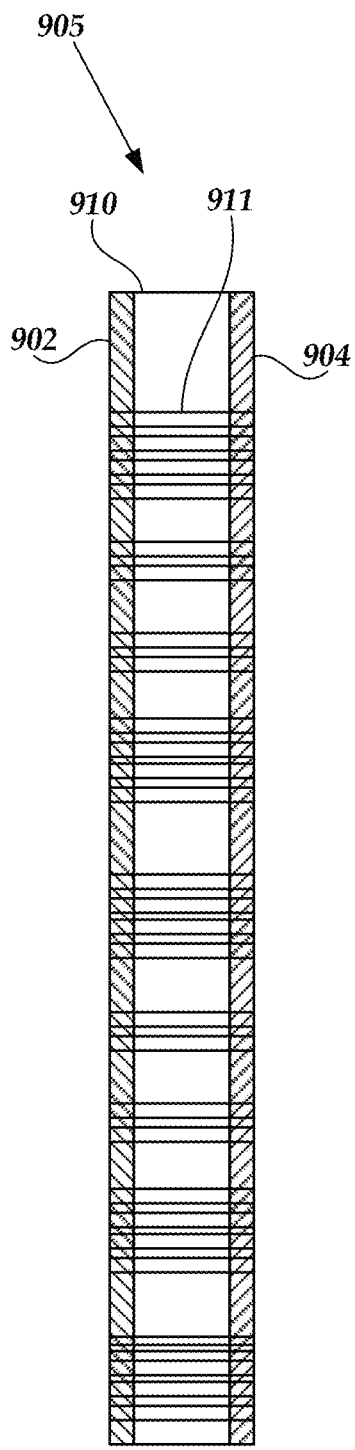
FIG. 9A is a schematic cross-sectional view of one embodiment of an electrode structure, according to the invention.
Figure 9B:
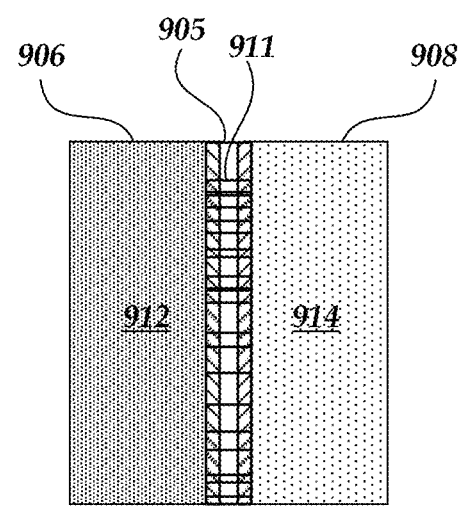
FIG. 9B is a schematic cross-sectional view of the electrode structure of FIG. 9A in a redox flow battery arrangement, according to the invention.

An alternative to the electrodes 102, 104 and separator 110 is an electrode structure (which can be referred to as a "bipolar electrode") 905 that acts as an anode, a cathode, and a separator, as illustrated in FIG. 9A. The electrode structure 905 includes a base 910 with conductive elements 911 that extend through the base from a first surface of the base to a second surface of the base. These conductive elements 911 are exposed in the two half-cells 906, 908, as illustrated in FIG. 9B. The base 910 can act as the separator 110.

The base 910 is made of a material that is impermeable to, or substantially resists or hinders flow of, the anolyte and catholyte through the base. Examples of such materials include plastic (such as polypropylene, polyethylene, perfluoroalkoxy alkane (PFA), polyvinylidene fluoride (PVDF), polytetrafluoroacetic acid (PTFE), polyvinyl chloride (PVC), chlorinated polyvinyl chloride (CPVC), or the like), a resin, a carbon or graphite plate, a metal plate, a metal-alloy plate, or the like. In at least some embodiments, the base is non-conductive. In at least some embodiments, the base is conductive, such as a graphite plate. In at least some embodiments, the conductivity of the base 910 between the first surface and the second surface is less than the conductivity of the conductive elements 911.

The conductive elements 911 extend through the base 910 so that they are accessible to both the anolyte and catholyte. Examples of suitable conductive elements include, but are not limited to, metal wires (for example, titanium iron, copper, zinc, silver, gold, or platinum wires), carbon fibers, graphite fibers aligned for electron conduction through the base, silicon carbide or the like or any combination thereof. The conductive elements 911 form part of (or the entirety of) electrodes 902, 904 which are disposed on the opposing first and second surfaces of the base 910. Optionally, electrodes 902, 904 can include additional conductive material, such as metal, carbon fiber, carbon felt, silicon carbide, or the like, that does not extend through the base 910 but is disposed on the surface of the base or extend into, but not through, the base.

In at least some embodiments, the base 910 can be molded with the conductive elements 911 arranged so that the conductive elements will extend through the base. In at least some embodiments, the conductive elements 911 may be inserted or pushed through the base 910. In at least some embodiments, the base 910 can be heated after passing the conductive elements 911 through the base to flow the material of the base and embed medial portions of the conductive elements within the base.

Although the electrode structure 905 is disclosed herein in the context of a Fe—Cr redox flow battery system, it will be recognized that the electrode structure 905 can be used in other redox flow battery system including, but not limited to, vanadium redox flow battery systems, vanadium-bromine redox flow battery systems, vanadium-iron redox flow battery systems, zinc-bromine redox flow battery systems, all iron redox flow battery systems, organic aqueous redox flow battery systems, or the like. The electrode structure 905 can also be used in other electrochemical systems and methods.

Redox flow battery systems can be safe, reliable, and provide a reusable energy storage medium. It has been challenging, however, to identify a redox flow battery system that has a desirable storage energy with a long life (e.g., a flow battery system that maintains its storage capacity for many charge/discharge cycles) and is made of materials that have abundant availability (e.g., materials that are abundant on Earth and are commercially mined and available in relatively large quantities). Current lithium and vanadium batteries utilize materials that have limited availability. The storage capacity of many conventional battery systems also degrades when subjected 10, 50, or 100 charge/discharge cycles or more. A further challenge for aqueous redox flow battery systems is to manage or avoid the evolution of hydrogen or oxygen from water.

As described herein, a suitable and useful redox flow battery system is an iron-chromium (Fe—Cr) redox flow battery system utilizing $Fe^{3+}/Fe^{2+}$ and $Cr^{3+}/Cr^{2+}$ redox chemistry. Iron and chromium are generally readily commercially available and, at least in some embodiments, the storage capacity of a Fe—Cr redox flow battery system does not degrade by more than 10% or 20% over at least 100, 200, 250, or 500 charge/discharge cycles or can be configured, using maintenance procedures, to maintain at least 70%, 80%, or 90% storage capacity over at least 100, 200, 250, or 500 charge/discharge cycles.

In at least some embodiments, the electrolytes (i.e., the catholyte or anolyte) of a Fe—Cr redox flow battery system include an iron-containing compound or a chromium-containing compound (or both) dissolved in a solvent. In some embodiments, the anolyte and catholyte contain both the iron-containing compound and the chromium-containing compound. The concentrations of these two compounds in the anolyte and catholyte can be the same or different. In other embodiments, the catholyte includes only the iron-containing compound and the anolyte includes only the chromium-containing compound.

In at least some embodiments, the chromium-containing compound can be, for example, chromium chloride, chromium sulfate, chromium bromide, or the like or any combination thereof. In at least some instances, it has been found that chloride-complexed chromium ions (for example, $Cr(H_2O)_5Cl^{2+/+}$) have faster reaction kinetics and lower $H_2$ production than at least some other chromium ion complexes (for example, $Cr(H_2O)_6^{3+/2+}$). Accordingly, the inclusion of chloride in the anolyte (for example, from the chromium-containing compound, the solvent, or both) can be beneficial.

It has been found that chromium can form complexes with nitrogen-containing ligands that, at least in some instances, are more stable than chloride complexes of chromium. In at least some instances, the chromium complexes with nitrogen-containing ligands may be more redox active or may result in fewer side reactions (such as hydrogen generation) in the Fe—Cr redox flow battery. In at least some embodiments, the chromium-containing compound can be a chromium complex including at least one of the following nitrogen-containing ligands: ammonia ($NH_3$), ammonium ($NH_4^+$), urea ($CO(NH_2)_2$), thiocyanate ($SCN^-$), or thiourea ($CS(NH_2)_2$) or any combination thereof. Examples of complexes with combinations of different nitrogen-containing ligands include chromium complexes with ammonia and urea.

In at least some embodiments, the chromium complex has the formula $[Cr^{3+}(J)_x(M)_y(H_2O)_z]$ where x is a positive integer and y and z are non-negative integers with x+y+z=6, J is selected from the group consisting of $NH_3$, $NH_4^+$, $CO(NH_2)_2$, $SCN^-$, or $CS(NH_2)_2$, and each M is different from J and independently selected from the group consisting of $Cl^-$, $F^-$, $Br^-$, $I^-$, $NH_4^+$, $NH_3$, ethylenediaminetetraacetic acid (EDTA), $CN^-$, $SCN^-$, $S^{2-}$, $O-NO_2^-$, $OH^-$, $NO_2^-$, $CH_3CN$, $C_5H_5N$, $NC_5H_4-C_5H_4N$, $C_{12}H_8N_2$, $CO(NH_2)_2$, $CS(NH_2)_2$, $P(C_6H_5)_3$, $-CO$, $CH_3-CO-CH_2-CO-CH_3$, $NH_2-CH_2-CH_2-NH_2$, $NH_2CH_2COO^-$, $O-SO_2^{2-}$, or $P(o\text{-tolyl})_3$. This chromium-containing compound can also include any suitable counterions including, but not limited to, ammonium, chloride, bromide, iodide, fluoride, sulfate, nitrate, or the like or any combination thereof. One example of a chromium complex is $Cr(NH_3)_xCl_y(H_2O)_z$ where x and z are in the range of 1 to 6 and y is in the range of 1 to 3. In at least some embodiments, the ratio of Cr to $NH_3$ (or other nitrogen-containing ligand) for the anolyte or catholyte can be less than 1 as long as a portion of the chromium ions are complexed with ammonia (or other nitrogen-containing ligand).

In at least some embodiments, the chromium complex can be created in-situ in the electrolyte (either the anolyte or catholyte or both) by exposing a chromium salt (for example, chromium chloride, chromium sulfate, chromium bromide, or the like or any combination thereof) or other chromium compound to a ligand-containing compound (for example, ammonia, ammonium chloride, urea, potassium thiocyanate, sodium thiocyanate, or thiourea.)

In at least some embodiments, the molar ratio of the nitrogen-containing ligand(s) to chromium in the electrolyte (either the anolyte or catholyte or both) is in the range of 1:10 to 10:1. In the case of a chromium complex with ammonia and urea, the molar ratio of ammonia to urea is in the range of 1:10 to 10:1. It will be understood that at least some of the nitrogen-containing ligand(s) may not be complexed with chromium. For example, at least some of the nitrogen-containing ligand(s) may be complexed with iron or may not be complexed within the electrolyte.

The iron-containing compound can be, for example, iron chloride; iron sulfate; iron bromide; an iron complex including at least one of ammonia ($NH_3$), ammonium ($NH_4^+$), urea ($CO(NH_2)_2$), thiocyanate ($SCN^-$), or thiourea ($CS(NH_2)_2$) as a ligand; or the like or any combination thereof. In at least some embodiments, the iron complex can include the same ligands as a chromium complex in the same electrolyte (either the anolyte or catholyte or both) or a subset of those ligands.

The solvent can be water; an aqueous acid, such as, hydrochloric acid, hydrobromic acid, sulfuric acid, or the like; or an aqueous solution including a soluble salt of a weak acid or base, such as ammonium chloride. In at least some embodiments, the water content of the anolyte or catholyte (or both) is at least 40, 45, or 50 wt. %. In at least some embodiments, both the catholyte and the anolyte of an Fe—Cr redox flow battery system includes iron chloride and chromium chloride dissolved in hydrochloric acid. In at least some embodiments, the catholyte of an Fe—Cr redox flow battery system includes iron chloride dissolved in hydrochloric acid and the anolyte includes chromium chloride dissolved in hydrochloric acid.

In at least some embodiments, a nitrogen-containing compound may also provide benefits relative to the solvent even if the nitrogen-containing compound is not a ligand of chromium or iron. For example, urea or thiourea in the electrolyte (either the anolyte or catholyte or both) can neutralize HCl in the electrolyte which may reduce HCl vapor during battery operation. As another example, a solvent with ammonium or ammonium ions (for example, replacing all or part of the hydrochloric acid with ammonium chloride) can result in an effective electrolyte (either the anolyte or catholyte or both) that has lower acidity.

In at least some embodiments, both the catholyte and the anolyte of an Fe—Cr redox flow battery system includes iron chloride and chromium chloride dissolved in hydrochloric acid. In at least some embodiments, the catholyte of an Fe—Cr redox flow battery system includes iron chloride dissolved in hydrochloric acid and the anolyte includes chromium chloride dissolved in hydrochloric acid.

In at least some embodiments, the molarity of iron in the catholyte or the anolyte or both is in a range of 0.5 to 2 or is at least 1 M. In at least some embodiments, the molarity of chromium in the anolyte or the catholyte or both is in a range of 0.1 to 2 or is at least 0.2, 0.5, or 1 M. In at least some embodiments, the molarity of the hydrochloric acid or other aqueous acid or base is in a range of 0.5 to 2. In at least some embodiments, the molarity of ammonia or ammonium ions is in a range of 0.5 to 4.

As one example of a method for forming an anolyte or catholyte with chromium complex, a 100 gram mixture of $FeCl_2 \cdot 4H_2O$ (35 wt. %), $CrCl_3 \cdot 6H_2O$ (45 wt. %), and $NH_4Cl$ (20%) was added to a 250 mL beaker and dissolved in distilled ionized water to form a 150 mL solution. Stirring of the solution at 50° C. to 60° C. accelerated dissolving. 2 mL of 37 wt. % HCl was added to the solution to adjust the pH.

In another example, a 100 gram mixture of $FeCl_2 \cdot 4H_2O$ (32 wt. %), $CrCl_3 \cdot 6H_2O$ (43 wt. %), and $CO(NH_2)_2$ (25%) was added to a 250 mL beaker and dissolved in distilled ionized water to form a 150 mL solution. 1.5 mL of 37 wt. % HCl was added to the solution to adjust the pH.

As a third example, a 100 gram mixture of $FeCl_2 \cdot 4H_2O$ (35 wt. %), $CrCl_3 \cdot 6H_2O$ (45 wt. %), $NH_4Cl$ (10%), and $CO(NH_2)_2$ (10%) was added to a 250 mL beaker and dissolved in distilled ionized water to form a 150 mL solution. 2 mL of 37 wt. % HCl was added to the solution to adjust the pH.

One challenge of previous Fe—Cr redox flow batteries is the generation or evolution of hydrogen ($H_2$) at the negative electrode as a result of the redox reactions. In at least some instances, increasing the utilization of the chromium in the redox flow battery can increase the production of hydrogen.

It is often desirable to limit or reduce the production of hydrogen in the redox flow battery. It has been found that limiting the utilization of chromium results in lower hydrogen generation while retaining adequate energy density in the redox flow battery system. In at least some embodiments, the chromium utilization in the anolyte of the redox flow battery system is limited to no more than 80%, 70%, or 60% or less. In at least some embodiments, the chromium utilization in the anolyte is limited by amount of iron in the catholyte or is limited by 100% utilization of the iron in the catholyte.

Chromium utilization can be managed, at least in part, by managing the relative amounts of chromium and iron in the redox flow battery system. The term "molar ratio" as used herein means the ratio of the molar amount of one component with respect to the molar amount of a second component. In at least some embodiments, the molar ratio of chromium in the anolyte to iron in the catholyte (Cr (anolyte)/Fe(catholyte)) is not 1, but, instead, the Cr(anolyte)/Fe(catholyte) molar ratio is at least 1.25 or more (for example, at least 1.43, 1.67, or more). In at least some embodiments, the molar amount of iron in the catholyte is no more than 80%, 70%, or 60% or less of the molar amount of chromium in the anolyte. In at least some embodiments, the smaller amount of available iron limits the utilization of the available chromium to no more than 80%, 70%, or 60%. In at least some embodiments, the anolyte and the catholyte are both mixed iron/chromium solutions.

In at least some embodiments, the concentration of iron in the catholyte is different from the concentration of chromium in the anolyte to produce the desired molar ratio. In at least some embodiments, the concentration of iron in the catholyte is no more than 80%, 70%, or 60% or less of the concentration of chromium in the anolyte.

In at least some embodiments, the concentration of iron in the catholyte and the concentration of chromium in the anolyte is the same. In such embodiments, the molar ratio of chromium and iron in the anolyte and catholyte, respectively, can be selected by selection of the volumes of the anolyte and catholyte. In at least some embodiments, the volume ratio of anolyte to catholyte is at least 1.25:1 or more (for example, at least 1.43:1 or 1.67:1 or more) leading to a molar ratio that is equal to the volume ratio when the concentrations of chromium in the anolyte and iron in the catholyte are the same. In at least some embodiments, the volume of the catholyte is no more than 80%, 70%, or 60% of the volume of the anolyte.

In some embodiments, the volumes of the anolyte and the catholyte can be based on the volume of the respective half-cells 106, 108. In some embodiments, the volumes of the anolyte and the catholyte can be based on the volume of the respective catholyte and anolyte portions of the redox flow battery system 100. For example, the catholyte portion can include the half-cell 108, the catholyte tank 118, and the catholyte distribution arrangement 126. The anolyte portion can include the half-cell 106, the anolyte tank 116, and the anolyte distribution arrangement 124.

It will be recognized that a combination of both different iron and chromium concentrations and different catholyte and anolyte volumes can be used to achieve the desired molar ratio of chromium in the anolyte and iron in the catholyte. In at least some of these embodiments, the volume of the catholyte is no more than 95%, 90%, 80%, 70%, or 60% of the volume of the anolyte.

In at least some instances, it is found that higher $H^+$ concentration in the anolyte promotes hydrogen generation. To reduce hydrogen generation by the anolyte, the $H^+$ concentration in the initial anolyte can be lower than the $H^+$ concentration in the initial catholyte. In at least some embodiments, the $H^+$ concentration in the initial anolyte is at least 10, 20, 25, or 50 percent lower than the $H^+$ concentration in the initial catholyte.

Table 1 illustrates a 1:1 volume ratio of anolyte to catholyte at different states of charge (SOC) where the state of charge represents the percentage conversion of the initial active ionic species in the anolyte and catholyte to the reduced/oxidized ionic species. It will be recognized that the concentration of $H^+$ changes to maintain charge balance between the anolyte and catholyte. In Table 1, the initial anolyte is 1.25M $Fe^+$, 1.25M $Cr^{3+}$, and 1.25M $H^+$ and the initial catholyte is 1.25M $Fe^{2+}$, 1.25M $Cr^{3+}$, and 2.5M $H^+$. These particular concentrations are selected so that the $H^+$ concentration is equal at the 50% state of charge.

TABLE 1

| State of Charge | Anolyte | | | Catholyte | | |
|---|---|---|---|---|---|---|
| | $Cr^{2+}$ | $Cr^{3+}$ | $H^+$ | $Fe^{2+}$ | $Fe^{3+}$ | $H^+$ |
| 0 | 0 | 1.25 | 1.25 | 1.25 | 0 | 2.5 |
| 25 | 0.3125 | 0.9375 | 1.5625 | 0.9375 | 0.3124 | 2.1875 |
| 50 | 0.625 | 0.625 | 1.875 | 0.625 | 0.625 | 1.875 |
| 75 | 0.9375 | 0.3125 | 2.1875 | 0.3125 | 0.9375 | 1.5625 |
| 100 | 1.25 | 0 | 2.5 | 0 | 1.25 | 1.25 |

Table 2 illustrates a 2:1 volume ratio of anolyte to catholyte at different states of charge (SOC). In Table 2, the initial anolyte is 1.25M $Fe^{2+}$, 1.25M $Cr^{3+}$, and 1.5625M $H^+$ and the initial catholyte is 1.25M $Fe^{2+}$, 1.25M $Cr^{3+}$, and 2.5M $H^+$. These particular concentrations are selected so that the $H^+$ concentration is equal when the anolyte is at 25% SOC and the catholyte is at 50% SOC. The difference in SOC between the anolyte and catholyte arises due to anolyte having twice the volume of the catholyte.

TABLE 2

| State of Charge | Anolyte | | | Catholyte | | |
|---|---|---|---|---|---|---|
| | $Cr^{2+}$ | $Cr^{3+}$ | $H^+$ | $Fe^{2+}$ | $Fe^{3+}$ | $H^+$ |
| 0 | 0 | 1.25 | 1.5625 | 1.25 | 0 | 2.5 |
| 25 | 0.3125 | 0.9375 | 1.875 | 0.9375 | 0.3124 | 2.1875 |
| 50 | 0.625 | 0.625 | 2.1875 | 0.625 | 0.625 | 1.875 |

TABLE 2-continued

| State of Charge | Anolyte | | | Catholyte | | |
|---|---|---|---|---|---|---|
| | $Cr^{2+}$ | $Cr^{3+}$ | $H^+$ | $Fe^{2+}$ | $Fe^{3+}$ | $H^+$ |
| 75 | | | | 0.3125 | 0.9375 | 1.5625 |
| 100 | | | | 0 | 1.25 | 1.25 |

Another challenge with Fe—Cr redox flow battery systems, as well as other redox flow battery systems, is the presence of metal impurities, such as nickel, antimony, zinc, bismuth, platinum, gold, or copper. In at least some instances, these metal impurities can increase hydrogen generation on the negative electrode surface. Such metallic impurities can be present as a natural impurity or as a part of the refining or manufacturing of the iron and chromium compounds or other portions of the redox flow battery system or through any other mechanism.

Figure 3:
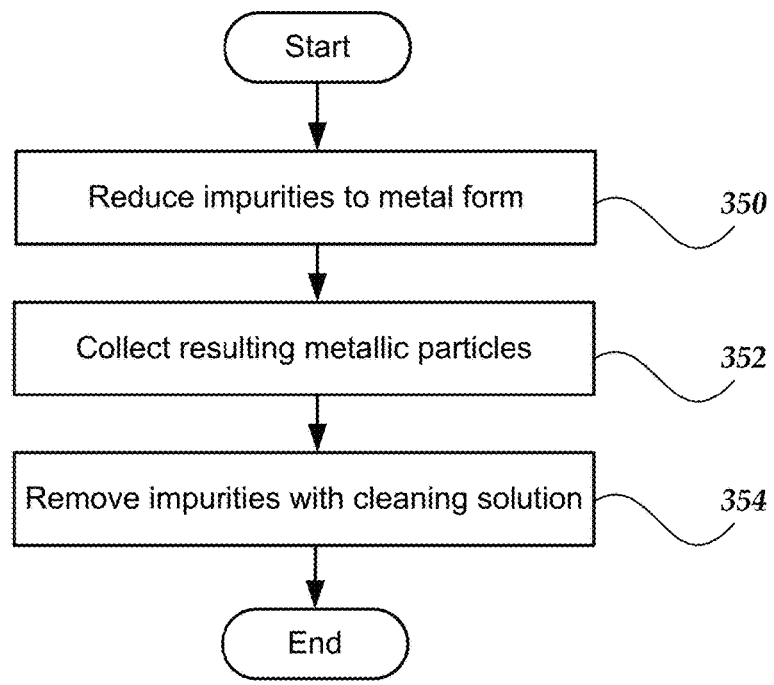
FIG. 3 is a flowchart of a one embodiment of removing or reducing impurities in a redox flow battery system, according to the invention.

In at least some embodiments, the redox flow battery system 100 can be configured to remove, or reduce the level of, these impurities. As illustrated in FIG. 3, in at least some embodiments, to remove, or reduce the level of, these impurities, the redox flow battery system 100 is configured to electrochemically reduce at least some of the impurities to metal form (step 350), collect the resulting metallic particles using a particulate filter or other arrangement such at the interdigitated electrode described below (step 352), and remove these impurities using a cleaning solution containing an oxidizing species (step 354).

Figure 2:
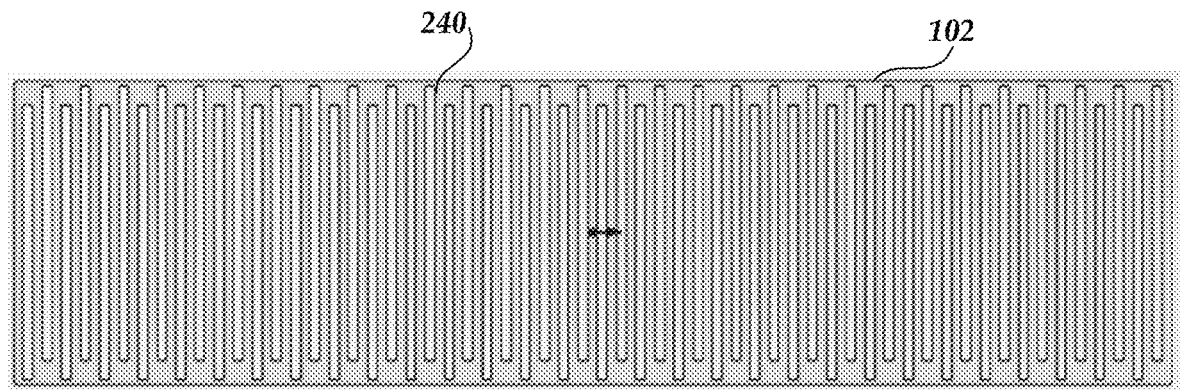
FIG. 2 is a schematic diagram of one embodiment of an electrode for a redox flow battery system, according to the invention.
Figure 12:
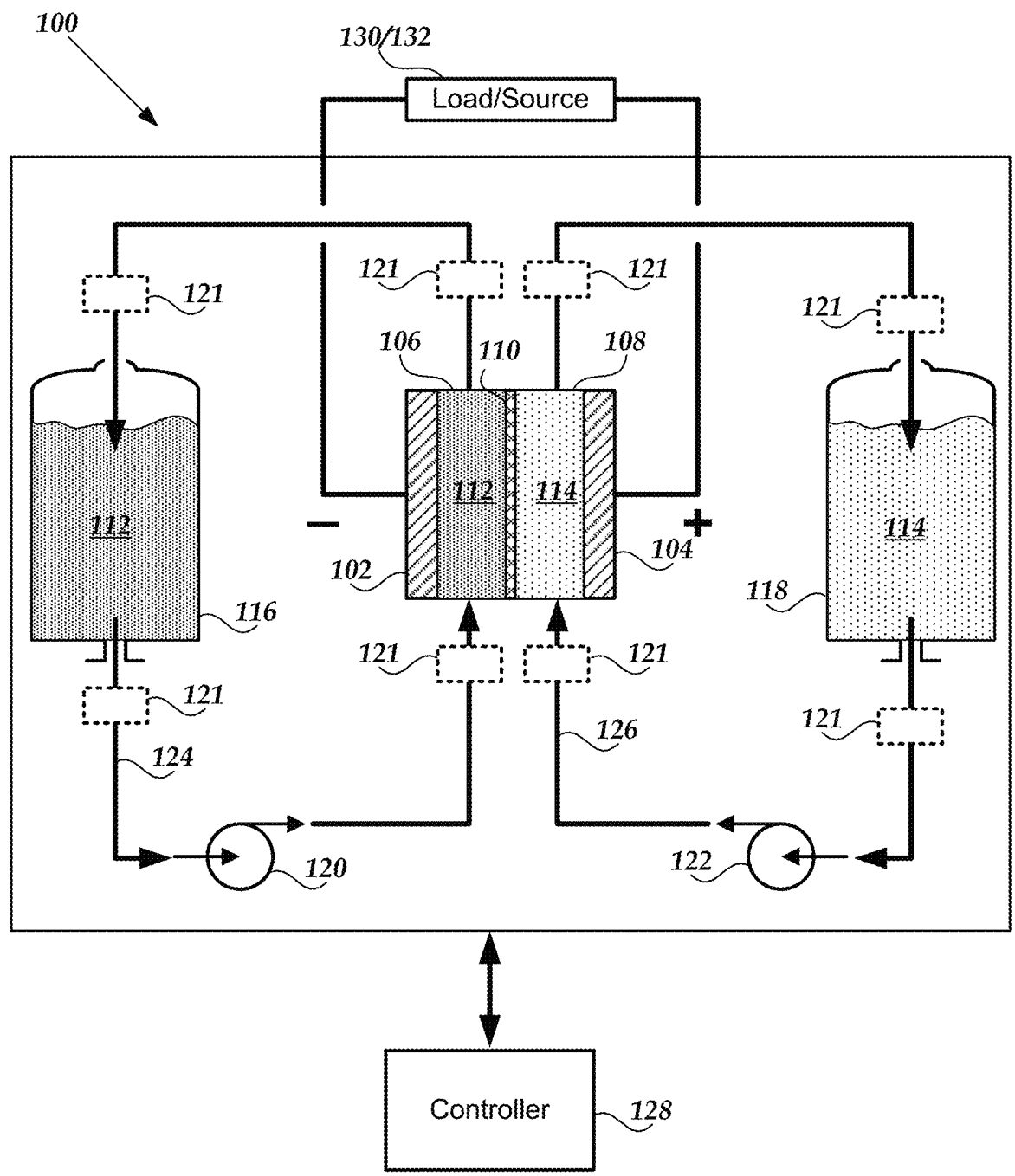
FIG. 12 is a schematic diagram of one embodiment of a redox flow battery system with particulate filters, according to the invention.

In at least some embodiments, the impurities are reduced within the anolyte as part of the redox reactions. The impurities form metallic particles or particulates when reduced during charging. The redox flow battery system 100 may include a particulate filter in the half-cell 106 or elsewhere to capture the metallic particles or particulates. In some embodiments, the negative electrode 102 may aid in filtering the metallic particles or particulates. To also facilitate the removal of the impurities, the negative electrode 102 can have an interdigitated structure, as illustrated in FIG. 2. The interdigitated structure includes empty or indented channels 240 for collection of particles of the metallic impurities during operation of the redox flow battery system 100. These particles can then be removed from the electrode during a maintenance cycle, as described below. FIG. 12 illustrates examples of alternative sites for a particulate filter 121 including, but not limited to, upstream or downstream of the anolyte/catholyte tanks 116, 118; downstream or upstream of the half-cells 106, 108, or the like or any combination thereof. In at least some embodiments, the filter 121 has a pore size in a range of 1-10 micrometers. In at least some embodiments, the positive and negative assignment of the electrodes 102, 104 can be reversed so that the impurities in both electrolyte tanks can be removed.

In at least some embodiments, the Fe—Cr redox flow battery systems described herein are arranged to remove these impurities using a solution with an oxidizing species, such as $Fe^{3+}$. As part of the maintenance of the redox flow battery system 100, during a maintenance cycle, a $Fe^{3+}$ (or other oxidizing) solution can be flowed through the anolyte portion of the system to remove the impurities from the electrode 102 or elsewhere in the system. In at least some embodiments, the $Fe^{3+}$ solution can be the catholyte or a portion of the catholyte. Alternative oxidizing solutions include, but are not limited to, hydrogen peroxide solutions, ferric chloride solutions, nitric acid, or the like. In at least some embodiments, the redox flow battery system 100 can include a cleaning solution tank (not shown) than can be coupled to the anolyte/catholyte distribution arrangements 124, 126 (or otherwise coupled to the filters 121) to periodically clean the filters.

In at least some embodiments, the removal or reduction of metallic impurities is performed during manufacturing of the redox flow battery system, prior to the onset of operation of the redox flow battery system, or during operation of the redox flow battery system, or any combination thereof. It will be understood that these methods and systems for removal of metallic impurities are not limited to Fe—Cr redox flow battery systems but can also be utilized in other redox flow battery systems such as vanadium, vanadium-bromine, vanadium-iron, zinc-bromine, and organic redox flow battery systems.

It has also been found that, in at least some embodiments, occasional exposure of the electrode 102 to the catholyte 114 can facilitate passivation of the surface of the electrode 102 and reduce hydrogen generation. As an example, in one Fe—Cr redox flow battery system the electrode 102 was treated with the catholyte 114 for 1 hour after 17 charge/discharge cycles and the hydrogen generation rate when down from 38.9 ml/min to 10.2 ml/min. In at least some embodiments, operation of the redox flow battery system can periodically (or when initiated or requested by an operator) include a maintenance period in which the half-cell 106 or electrode 102 is exposed to the catholyte (or an electrolyte that has components such as those specified above for the catholyte) for a period of time (for example, 5, 10, 15, 30, 45, 60 minutes or more.) The catholyte may be introduced to the half-cell 106 or electrode 102 once, periodically, intermittently, or continuously during the maintenance period. In at least some of these embodiments, the catholyte 114 can be returned to the catholyte tank 118 after the maintenance period. In at least some embodiments, the maintenance period may be performed when the state of charge of the anolyte is at least 50%, 75% or 90%.

Figure 4:
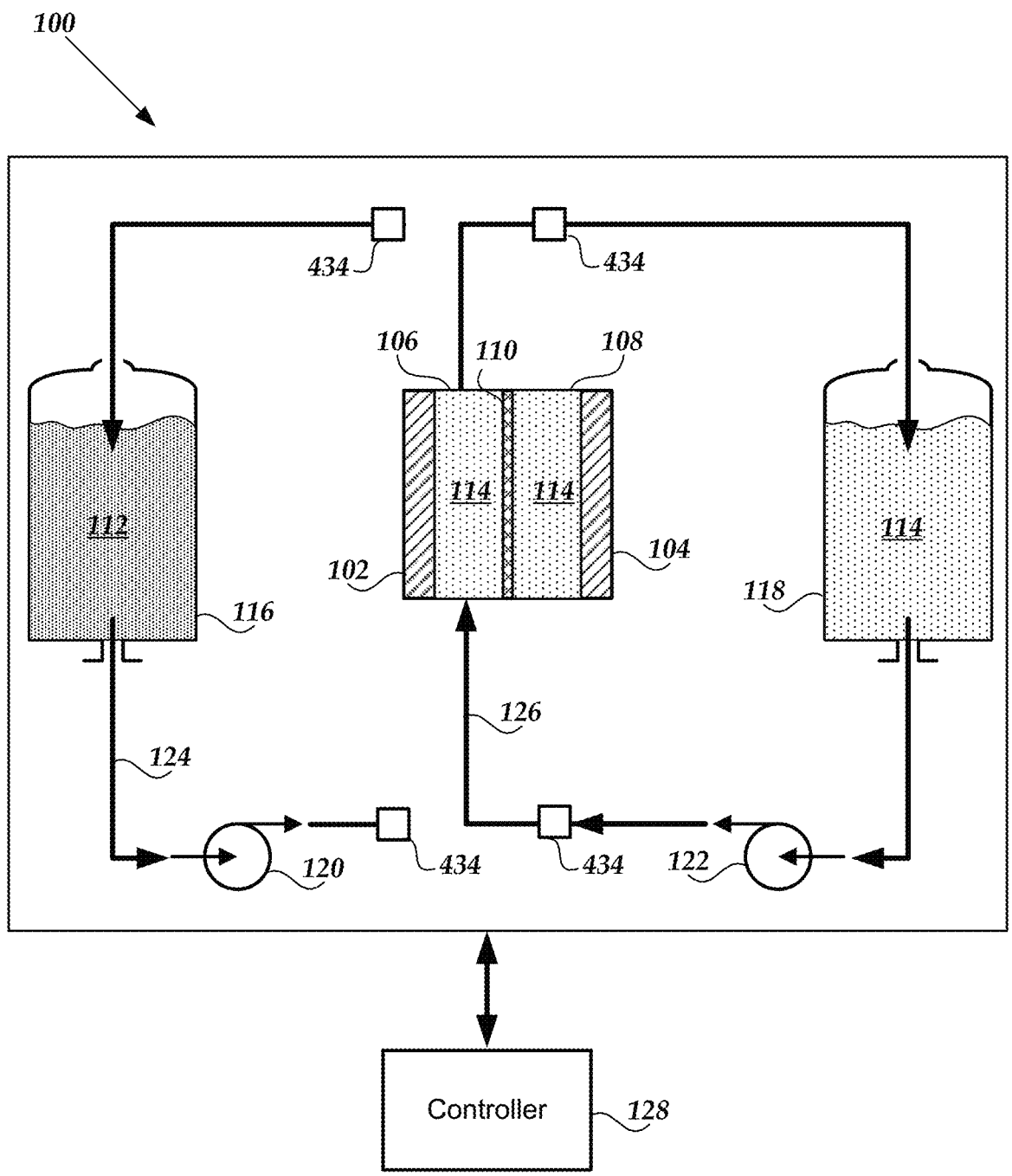
FIG. 4 is a schematic diagram of another embodiment of a redox flow battery system with the catholyte diverted into the second half-cell for maintenance, according to the invention.

FIG. 4 illustrates one embodiment of a redox flow battery system that includes switches 434 for disconnecting the anolyte distribution system 124 from the half cell 106 and connecting the catholyte distribution system 126 to the half-cell 106 to flow catholyte 114 into the half-cell 106. Such an arrangement can be used to reduce or remove metallic impurities or to passivate the electrode 102 or any combination thereof. The pump 122 can be used to flow catholyte 114 into the half-cell 106 or to remove the catholyte 114 from the half-cell 106 when the maintenance is complete.

A Fe—Cr redox flow battery system can have a reduction in storage capacity over time arising, at least in part, from the low standard potential of the $Cr^{2+}/Cr^{3+}$ pair which results in at least some level of hydrogen generation on the anolyte side of the system. As a result, the Average Oxidation State (AOS) of the active species in the system increases and the system can become unbalanced and the storage capacity decrease. It is useful, therefore, to have methods or arrangements for at least partially restoring the storage capacity by recovering the AOS.

In at least some embodiments, the AOS for a Fe—Cr redox flow battery system can be described as: AOS=((Moles of $Fe^{3+}$ in catholyte and anolyte)*3+(Moles of $Fe^{2+}$ in catholyte and anolyte)*2+(Moles of $Cr^{3+}$ in anolyte and catholyte)*3+(Moles of $Cr^{2+}$ in anolyte and catholyte)*2)/(Moles of Fe in catholyte and anolyte+Moles of Cr in anolyte and catholyte).

In at least some embodiments, the presence of ammonia or urea in the electrolytes (for example, as ligands of the chromium complex) can facilitate rebalancing of the system and restoration of the storage capacity. In at least some embodiments, the following electrolytic reactions occur at the electrodes:

$$7H_2O+2Cr^{3+}-6e^-\rightarrow Cr_2O_7^{2-}+14H^+ E_0=+1.33V$$

$$Fe^{3+}+e^-\rightarrow Fe^{2+} E_0=+0.77V$$

The chromate ions can react with urea or ammonia to regenerate $Cr^{3+}$ to rebalance the system:

$$Cr_2O_7^{2-}+8H^++CO(NH_2)_2\rightarrow 2Cr^{3+}+CO_2+N_2+6H_2O$$

$$Cr_2O_7^{2-}+8H^++2NH_3\rightarrow 2Cr^{3+}+N_2+7H_2O$$

In at least some embodiments, the resulting nitrogen or carbon dioxide can be released to prevent pressurization of the redox flow battery system.

Alternatively or additionally, in at least some embodiments, to rebalance the redox flow battery system the redox flow battery system includes a balance arrangement, in conjunction with either the anolyte or catholyte, to rebalance the system and restore storage capacity. In at least some embodiments, the balance arrangement utilizes a vanadium source (to produce oxovanadium ($VO^{2+}$) and dioxovanadium ($VO_2^+$) ionic species) and a reductant, such as an oxidizable hydrocarbon compound, to rebalance the system and restore storage capacity. The following embodiments illustrate the addition of a balance arrangement to a Fe—Cr redox flow battery system. It will be understood that such balance arrangements can be used with other redox flow battery systems, or other chemical and/or electrochemical systems.

Figure 5A:
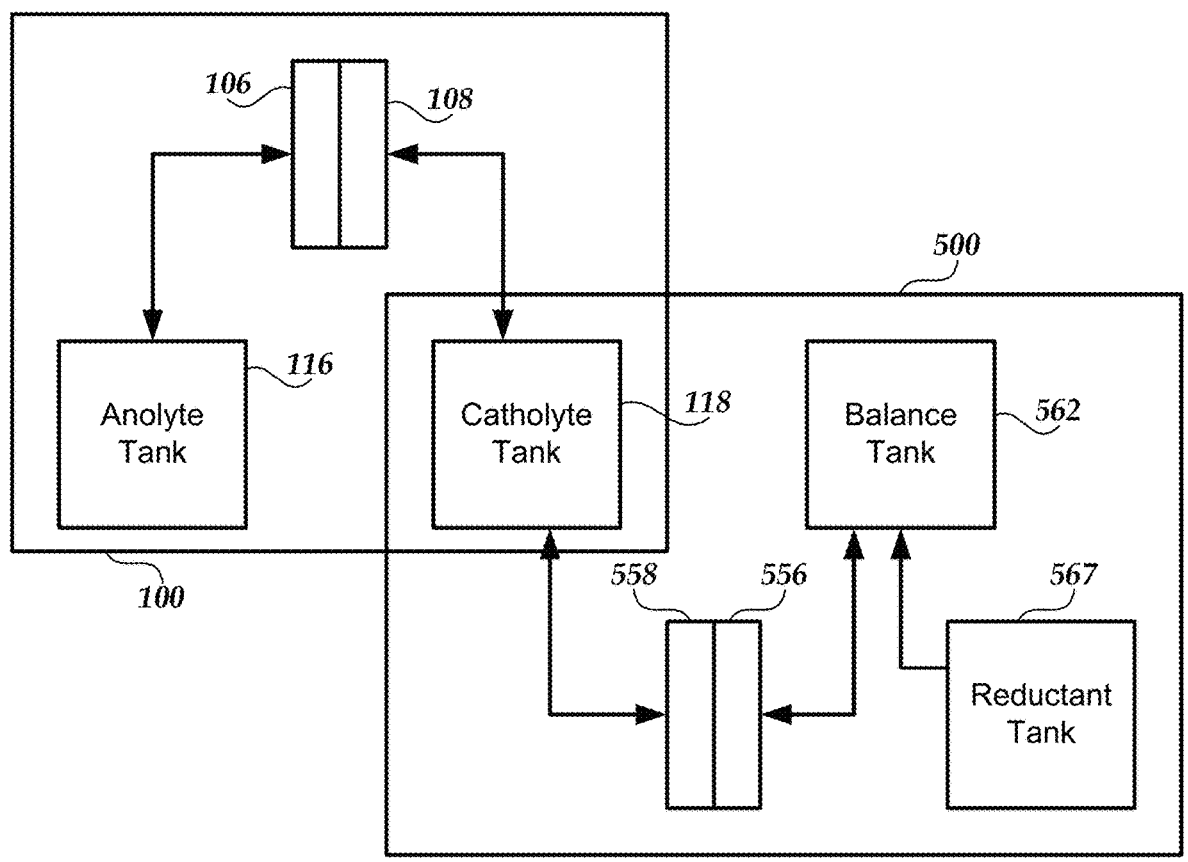
FIG. 5A is a schematic diagram of one embodiment of a system that includes a redox flow battery system in conjunction with a balancing arrangement, according to the invention.
Figure 5B:
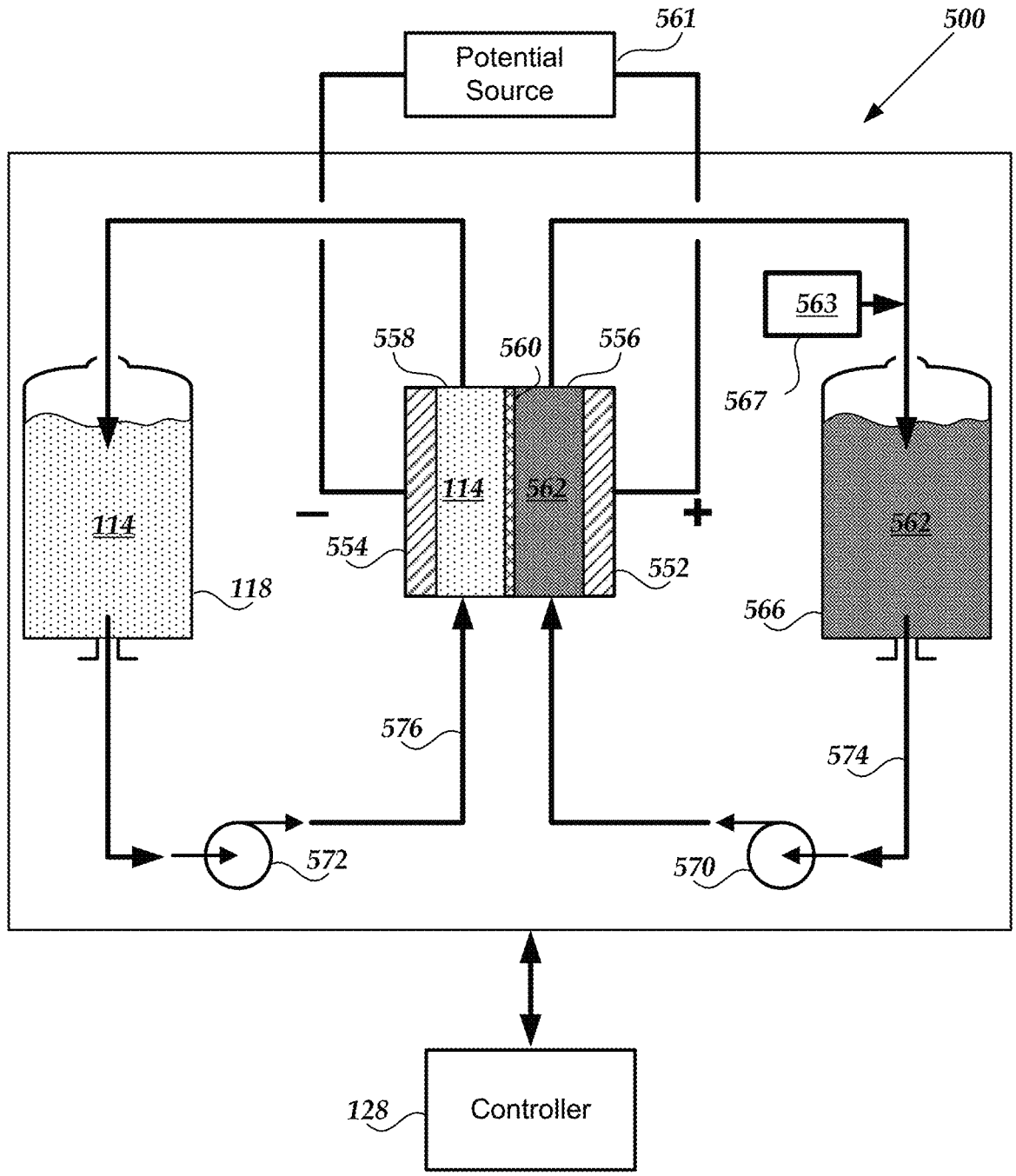
FIG. 5B is a schematic diagram of one embodiment of the balancing arrangement of the system of FIG. 5A, according to the invention.

FIG. 5A illustrates one embodiment of portions of the redox flow battery system 100 and a balance arrangement 500. FIG. 5B illustrates one embodiment of the balance arrangement 500. In this embodiment, the catholyte 114 is used in conjunction with a balancing electrolyte 562 (for example, an electrolyte containing $VO^{2+}/VO_2^+$) and a reductant 563 to rebalance the redox flow battery system 100. The balance arrangement 500 includes the catholyte tank 118; balance electrodes 552, 554; balance half-cells 556, 558; balance separator 560; catholyte balance pump 572; catholyte balance distribution system 576; balance tank 566; optional reductant tank 567; balance electrolyte pump 570; balance electrolyte distribution arrangement 574; and potential source 561. In at least some embodiments, the reductant can be urea or ammonia which may be present as ligands of a chromium or iron complex or can be otherwise provided as a reductant.

The following reaction equations illustrate one example of the rebalancing of the system using the iron-based catholyte 114, a balancing electrolyte 562 containing oxovanadium ions, and a reductant 563 containing urea or ammonia.

$$VO^{2+}+H_2O+Fe^{3+}\rightarrow VO_2^++Fe^{2+}+2H^+$$

$$6VO_2^++6H^++CO(NH_2)_2\rightarrow 6VO^{2+}+CO_2+N_2+5H_2O$$

$$6VO_2^++6H^++2NH_3\rightarrow 6VO^{2+}+N_2+6H_2O$$

In at least some embodiments, the resulting nitrogen or carbon dioxide can be released to prevent pressurization of the redox flow battery system.

The following reaction equations illustrate another example of the rebalancing of the system using the iron-based catholyte 114, a balancing electrolyte 562 containing oxovanadium ions, and a reductant 563 containing fructose, along with the application of an external potential from the potential source 561 of at least 0.23 V:

$$VO^{2+}+H_2O+Fe^{3+}\rightarrow VO_2^++Fe^{2+}+2H^+$$

$$24VO_2^++24H^++C_6H_{12}O_6\rightarrow 24VO^{2+}+6CO_2+18H_2O$$

Via the reactions illustrated in the two examples above, the AOS of the redox flow battery system 100 can be reduced and the $H^+$ ions lost in hydrogen generation restored. In at least some embodiments, this rebalancing (or restoring of the AOS or storage capacity recovery) does not utilize any metallic catalyst as such catalysts often increase hydrogen generation. In at least some embodiments, $VO^{2+}$ of the balance electrolyte 562 can be considered a homogeneous catalyst as the $VO^{2+}$ ions are regenerated using the reductant 563. In at least some embodiments, the reduction of $VO_2^+$ ions happens in balance half cell 566.

In at least some embodiments, the oxidation of the reductant 563 can be performed in the balance tank 566 instead of the half-cell 556 and may not require the application of an external potential, as long as $VO_2^+$ ions are available. Suitable reducing agents include sugars (for example, fructose, glucose, sucrose, or the like or any combination thereof), carboxylic acids (for example, formic acid, acetic acid, propionic acid, oxalic acid, or the like or any combination thereof), aldehydes (for example, formaldehyde, acetaldehyde, or the like or any combination thereof), alcohols (for example, methanol, ethanol, propanol, or the like or any combination thereof), ammonia, urea, thiourea, ammonium ions, other hydrocarbons, or hydrogen gas. In at least some embodiments, the reductant is soluble or at least partially soluble in water.

In at least some embodiments, the reductant 563 is added either periodically, intermittently, or continuously to the balance electrolyte 562 from the reductant tank 567. In at least some embodiments, this rebalancing process (for recovering the storage capacity or restoring the AOC) occurs continuously, intermittently, or periodically. For example, the catholyte balance pump 572 and balance electrolyte pump 570 can operate continuously, intermittently, or periodically. In at least some embodiments, the catholyte pump 122 can also be used as the catholyte balance pump 572. Moreover, the catholyte balance distribution arrangement 576 may include a valve to couple to, or disconnect from, the catholyte tank 118.

Figure 5C:
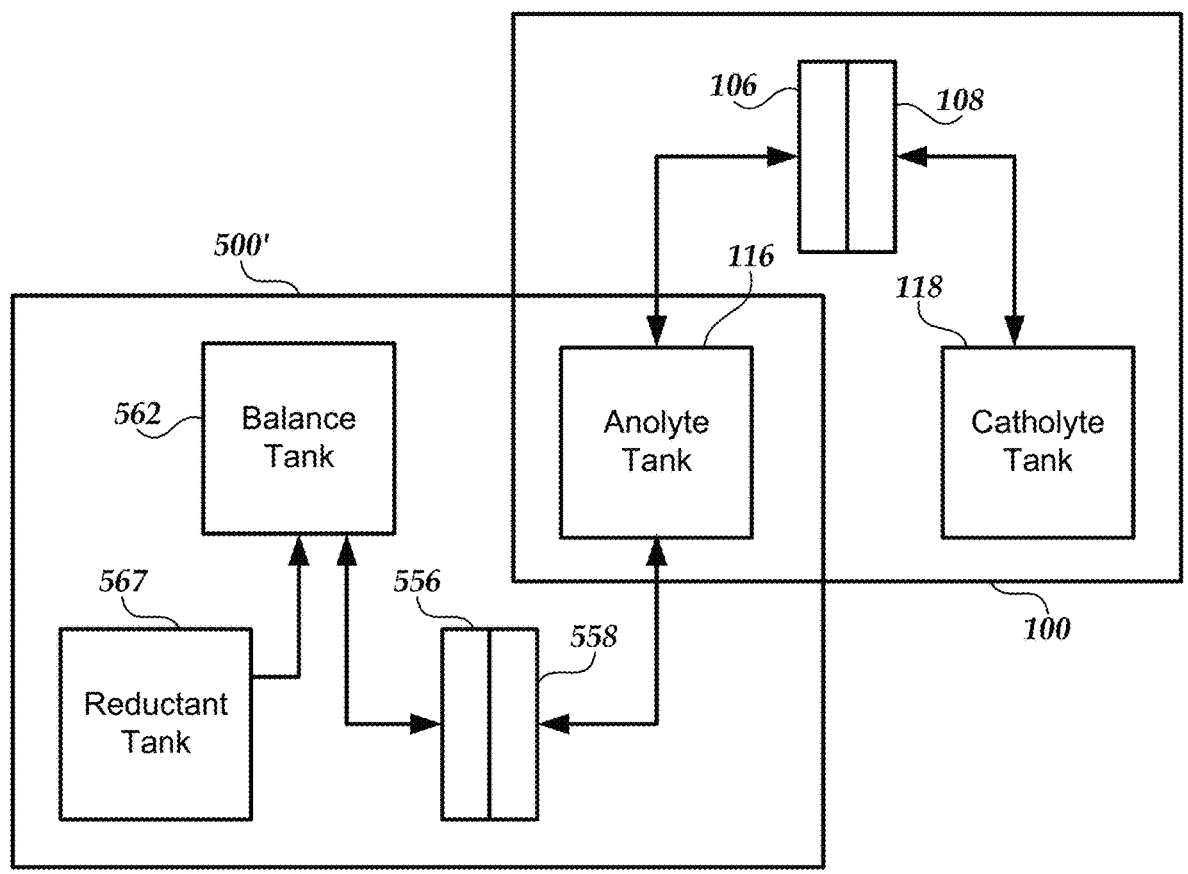
FIG. 5C is a schematic diagram of another embodiment of a system that includes a redox flow battery system in conjunction with a balancing arrangement, according to the invention.
Figure 5D:
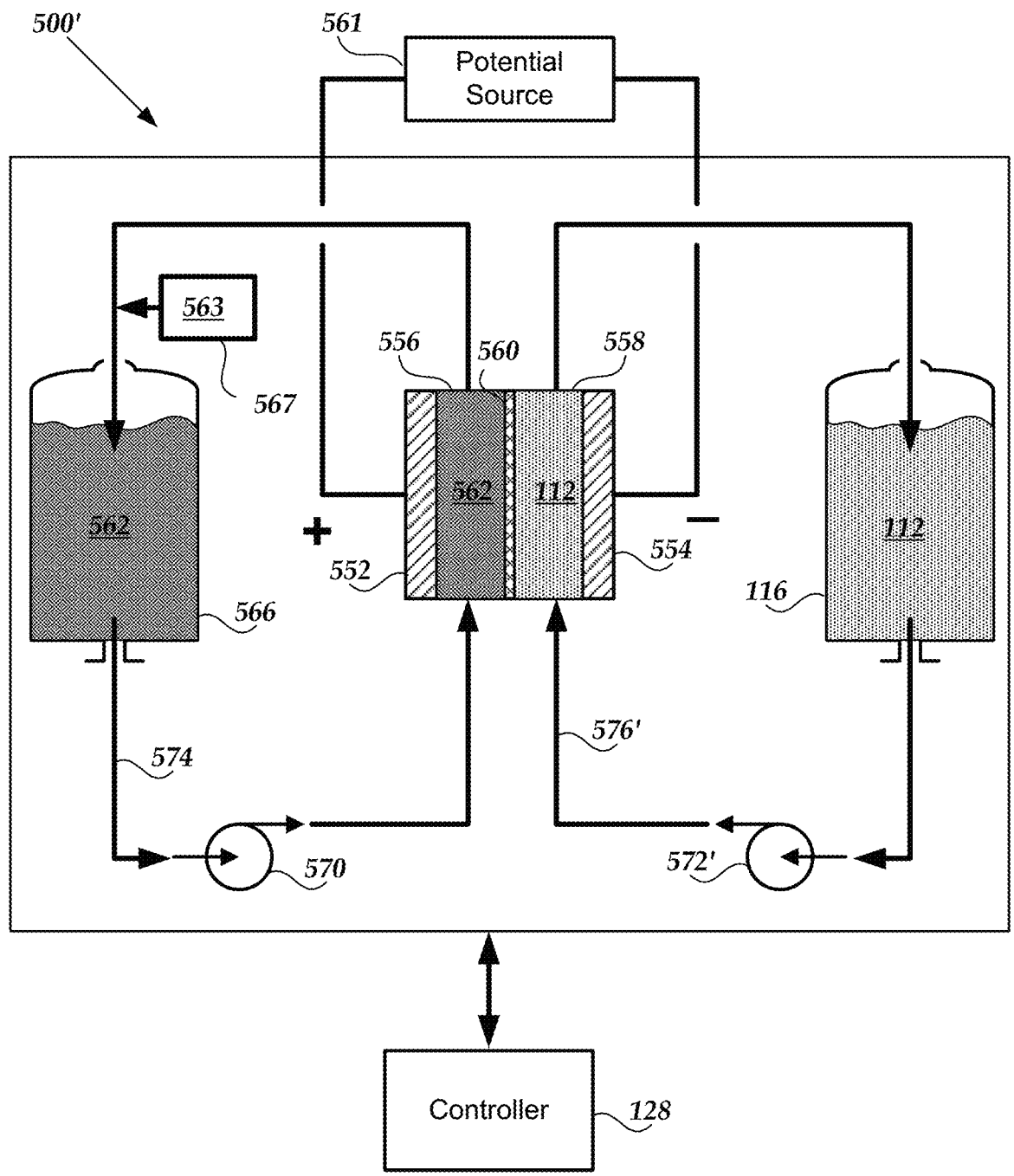
FIG. 5D is a schematic diagram of one embodiment of the balancing arrangement of the system of FIG. 5C, according to the invention.

FIGS. 5C and 5D illustrate another embodiment of redox flow battery system 100 with a balance arrangement 500' which operates with the anolyte 112 (and corresponding anolyte pump 572' and anolyte balance distribution arrangement 576') instead of the catholyte. In at least some embodiments, the anolyte pump 120 can also be used as the anolyte balance pump 572'.

The following reaction equations illustrate one example of the rebalancing of the system using the chromium-based anolyte 112, a balancing electrolyte 562 containing oxovanadium ions, and a reductant 563 containing fructose, along with the application of an external potential from the potential source 561 of at least 1.40 V:

$$VO^{2+}+H_2O+Cr^{3+}\rightarrow VO_2^++Cr^{2+}+2H^+$$

$$24VO_2^++24H^++C_6H_{12}O_6\rightarrow 24VO^{2+}+6CO_2+18H_2O$$

Other reductants, including those listed above, can be used instead of fructose.

Figure 5E:
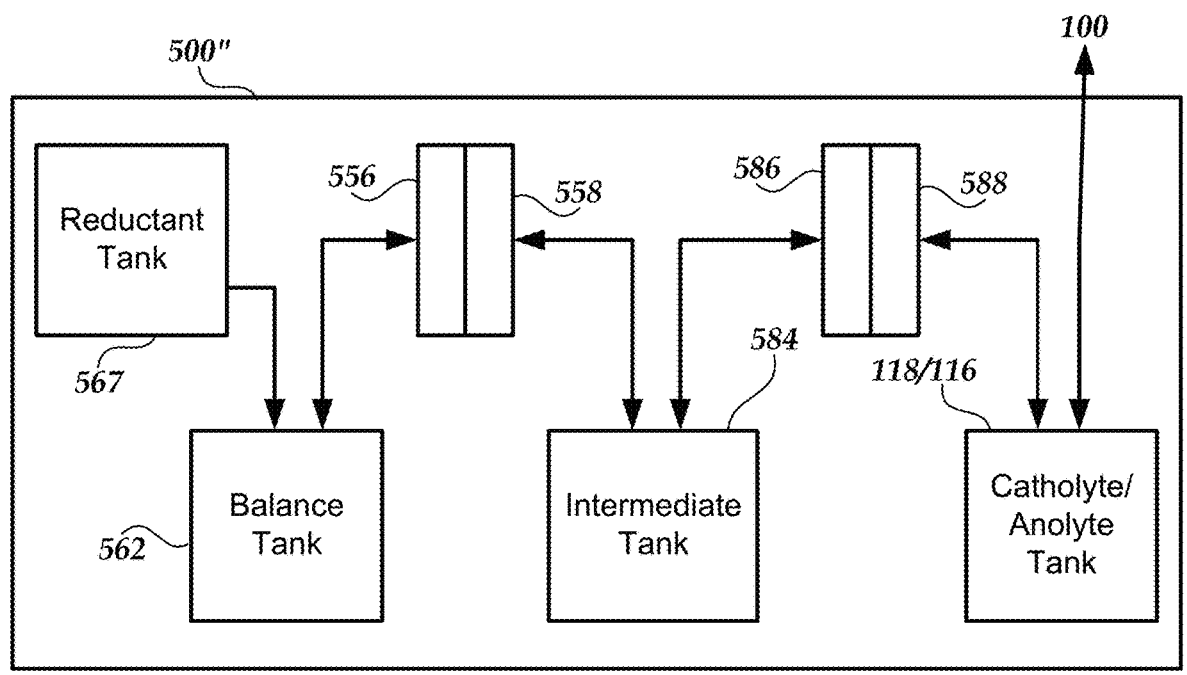
FIG. 5E is a schematic diagram of another embodiment of a balancing arrangement, according to the invention.

FIG. 5E illustrates another embodiment of a balance arrangement 500" which can be adapted to operate with either the catholyte or anolyte and the corresponding catholyte/anolyte tank 118/116 that is coupled to the remainder of the redox flow battery system 100. This embodiment incorporates an intermediate tank 584 and two intermediate half-cells 586, 588 between the catholyte/anolyte tank 118/116 and the balance tank 562 and corresponding half-cells 556/558. (As with the balance tank, there can be an intermediate pump and intermediate distribution arrangement, as well as an intermediate separator between the two half-cells 586, 588 and a source potential to apply a potential between the electrodes of the two half-cells 586, 588.) In one embodiment, the intermediate electrolyte in the intermediate tank 584 contains $V^{2+}/V^{3+}$ ions.

The following reaction equations illustrate one example of the rebalancing of the system using balance arrangement 500" and the catholyte 114 of redox flow battery system 100 (FIG. 1).

$$VO^{2+}+H_2O-e^-\rightarrow VO_2^++2H^+ \text{ (half-cell 556)}$$

$$V^{3+}+e^-\rightarrow V^{2+} \text{ (half-cell 558)}$$

$$V^{2+}-e^-\rightarrow V^{3+} \text{ (half-cell 586)}$$

$$Fe^{3+}+e^-\rightarrow Fe^{2+} \text{ (half-cell 588)}$$

$$24VO_2^++24H^++C_6H_{12}O_6\rightarrow 24VO^{2+}+6CO_2+18H_2O$$
(balance tank 562 or half cell 556 or both)

Other reductants, including those listed above, can be used instead of fructose.

Another embodiment uses the anolyte ($Cr^{2+}/Cr^{3+}$) instead of the catholyte in conjunction with the intermediate electrolyte and balance electrolyte. Yet another embodiment uses the anolyte and replaces the $V^{2+}/V^{3+}$ intermediate electrolyte with a $Fe^{2+}/Fe^{3+}$ intermediate electrolyte.

It will be recognized that the balance arrangement described herein can be utilized with other redox flow battery systems and, in particular, those that are capable of generating hydrogen gas. Examples of such redox flow battery system include, but are not limited to, Zn—Br or Zn—Cl redox flow battery systems, vanadium-based (for example, all vanadium, V—Br, V—Cl, or V-polyhalide) redox flow battery systems; Fe—V or other iron-based redox flow battery systems (for example, an all iron redox flow battery system); or organic redox flow battery systems.

Figure 6A:
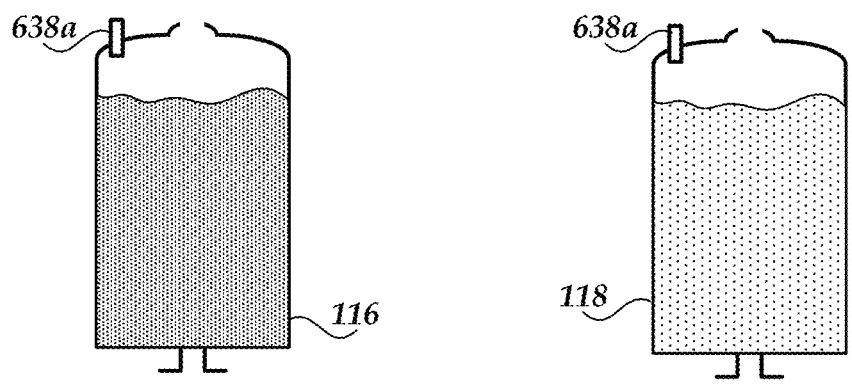
FIG. 6A is a schematic diagram of electrolyte tanks of a redox flow battery system with pressure release valves, according to the invention.
Figure 6B:
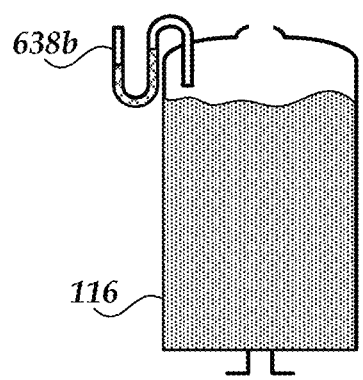
FIG. 6B is a schematic diagram of an electrolyte tank of a redox flow battery system with a liquid-containing U-tube arrangement for pressure relief, according to the invention.
Figure 6C:
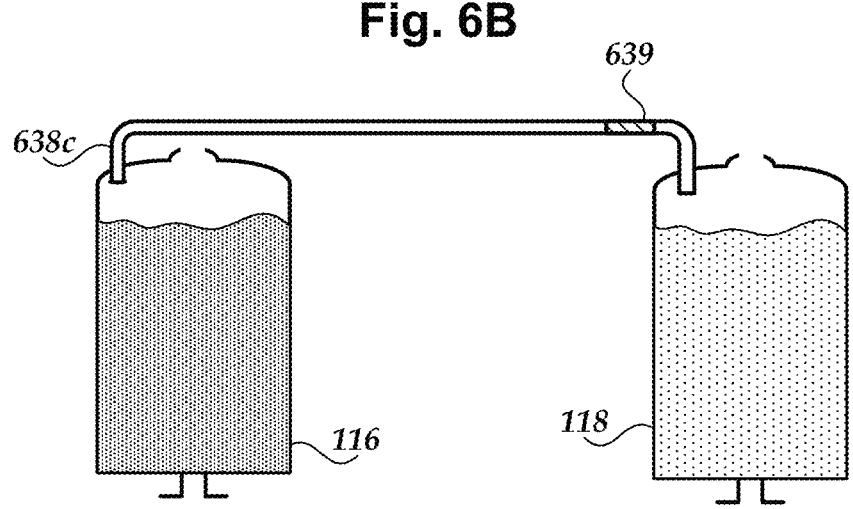
FIG. 6C is a schematic diagram of electrolyte tanks of a redox flow battery system with an arrangement for migration of gas between the tanks, according to the invention.

In some embodiments, during $Fe^{2+}$-overcharging conditions, chlorine gas ($Cl_2$) can be generated on the catholyte side of the redox flow battery system 100. The chlorine may be confined in the catholyte headspace of, for example, the catholyte tank 118 or half-cell 108 or the like or any combination thereof. Continued generation of chlorine gas increases the pressure in the confined catholyte headspace. In at least some embodiments, this may result in the chlorine gas migrating to the anolyte headspace via a connection 638c (FIG. 6C) which optionally includes one or more valves or switches 639 to control flow. In at least some embodiments, at least a portion of the chlorine gas may be absorbed by the anolyte solution. In at least some embodiments, the following reactions can occur between chlorine and the anolyte solution to chemically discharge the overcharged system:

$$2Cr^{2+}+Cl_2\rightarrow 2Cr^{3+}+2Cl^-$$

$$2Fe^{2+}+Cl_2\rightarrow 2Fe^{3+}+2Cl^-$$

In at least some embodiments, the redox flow battery system 100 may include a pressure release system to manage pressure in the catholyte or anolyte headspace. For example, a pressure relief valve 638a (FIG. 6A) or a liquid-containing U-tube arrangement 638b (FIG. 6B) may be coupled to the catholyte headspace to manage the pressure. Similarly, a pressure relief valve or a liquid-containing U-tube arrangement may be coupled to the anolyte headspace. In at least some embodiments, gas in the anolyte or catholyte headspace may exchange with an environmental atmosphere via a bi-directional gas pressure control system such as the U-tube arrangement. In at least some embodiments, a U-tube arrangement may also be used as a gas leak monitor. In at least some embodiments, the liquid in a U-tube arrangement may contain an acid level indicator that can be used to estimate the amount of acid-containing gas released into the environment by the redox flow battery system.

In at least some instances, the acidic solutions and chemical vapor from leaks of the electrolytes and chemical products of the redox reactions can damage electronic devices (for example, the controller 128, switches, valves, pumps, sensors, or the like) in the redox flow battery system 100. In addition, the leaks may result in environmental damage or contamination.

Figure 7:
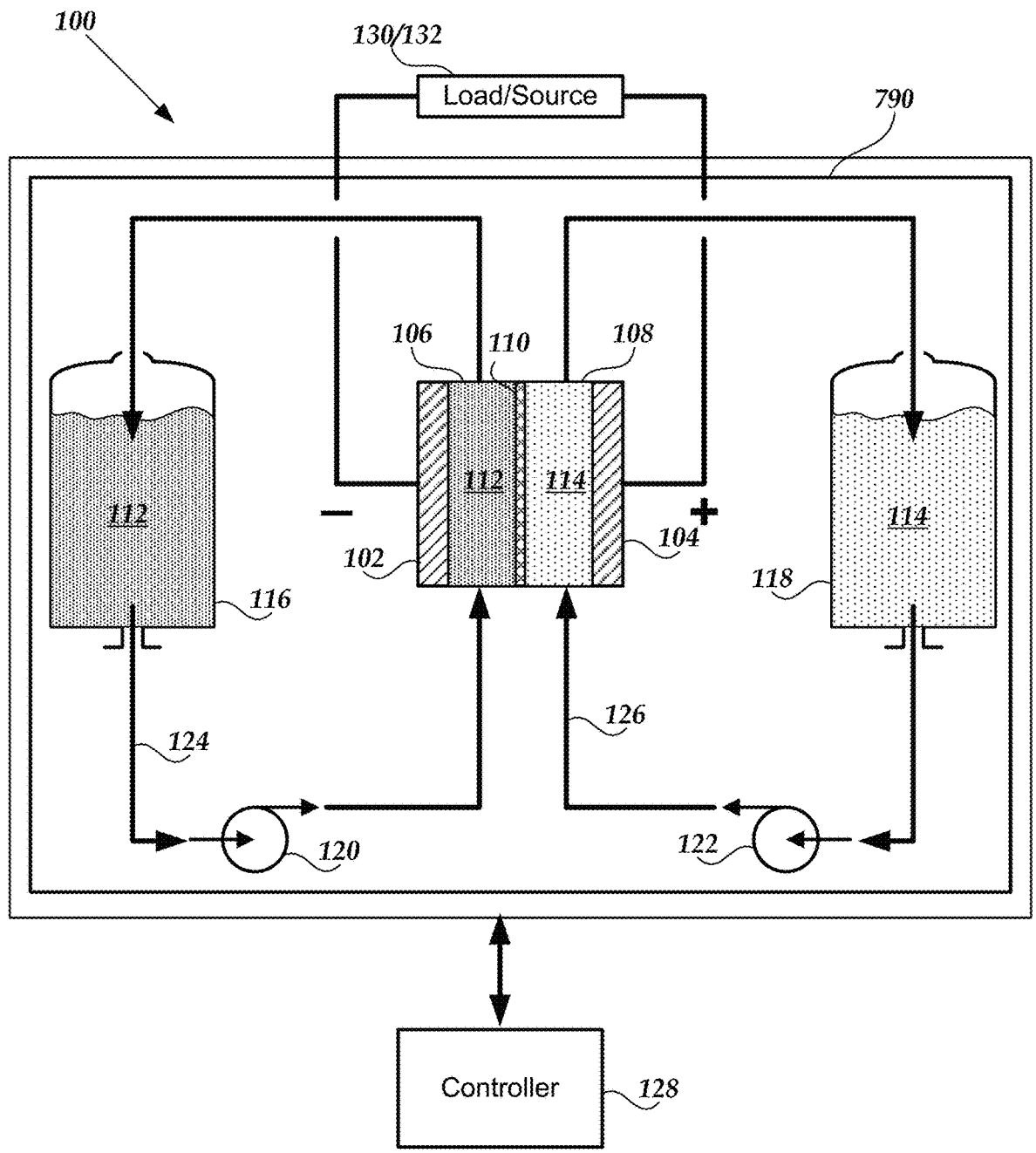
FIG. 7 is a schematic diagram of another embodiment of a redox flow battery system with a secondary container, according to the invention.

In at least some embodiments, all, or a portion, of the redox flow battery system 100 that contains the anolyte or catholyte or both can be situated in a secondary container 790 (FIG. 7) that contains acid absorbent material, such as sodium carbonate, sodium bicarbonate, calcium carbonate, or calcium oxide or the like. In at least some embodiments, the secondary container can contain sufficient acid absorbent material to neutralize at least 10, 25, 40, 50, 60, 70, 75, 90 percent or more of the anolyte or catholyte or both.

Figure 8:
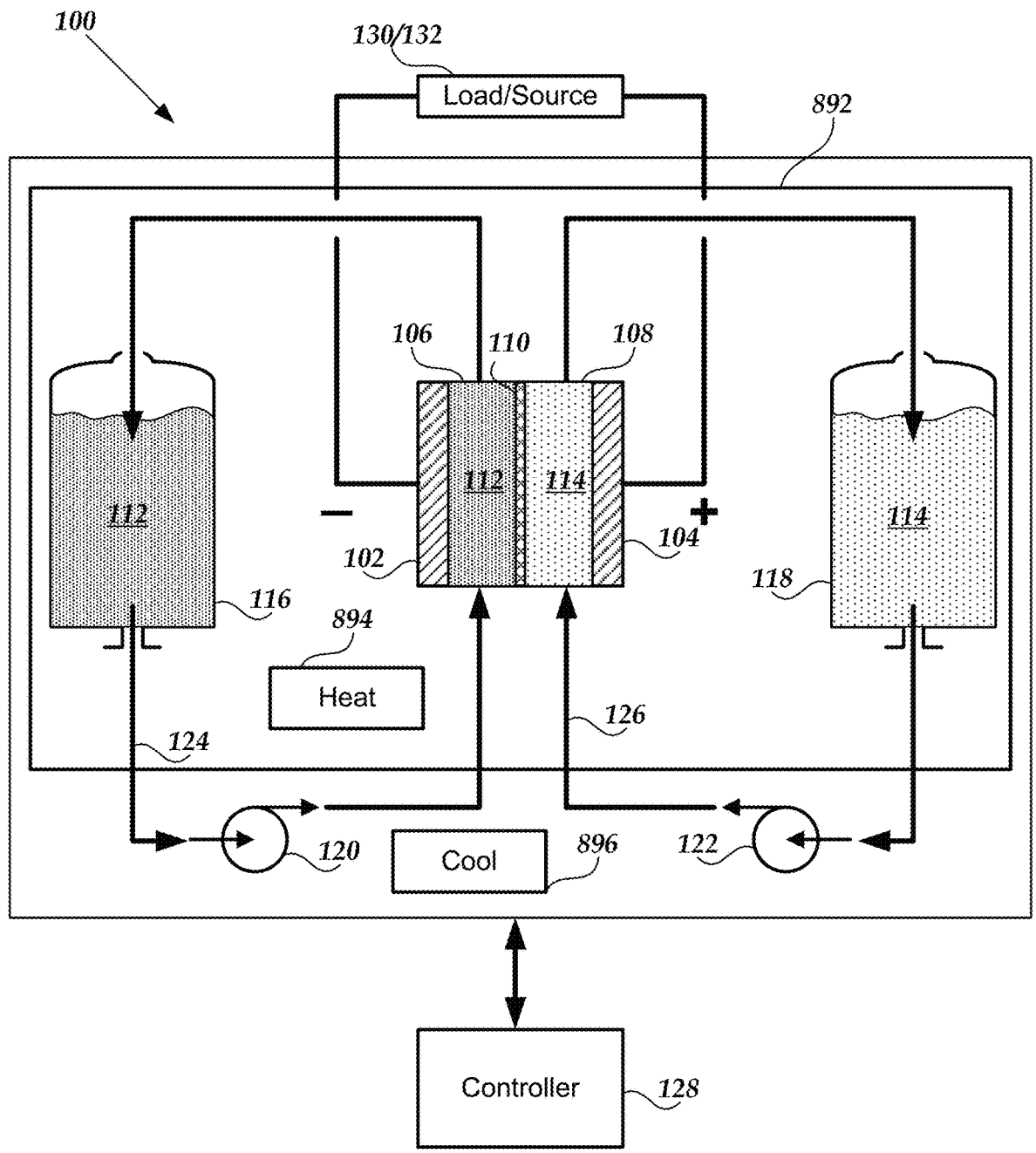
FIG. 8 is a schematic diagram of another embodiment of a redox flow battery system with a temperature zone, according to the invention.

In some embodiments, the anolyte and catholyte containing components, such as the anolyte or catholyte tanks 116, 118, half-cells 106, 108, at least some portions of the anolyte or catholyte distribution systems 124, 126, electrodes 102, 104, or the like, of the redox flow battery system 100 are maintained at a temperature of at least 50, 60, 70, or 80 degrees Celsius or more during charge or discharge periods in a temperature zone 892, as illustrated in FIG. 8. The temperature of these components may be maintained using one or more heating devices 894. In addition, one or more of electronic components of the redox flow battery system, such as one or more of the controller 128, the pumps 120, 122, one or more sensors, one or more valves, or the like, are maintained at a temperature of no more than 40, 35, 30, 25, or 20 degrees Celsius or less. The temperature of these components may be maintained using one or more cooling devices 896.

In at least some embodiments, chromite ore can be used as a starting material to obtain the chromium-containing compound used in the anolyte or catholyte described above. Chromite ore (a mixture of iron and chromium oxides represented by the chemical formula FeO—$Cr_2O_3$) is treated under high temperature (at least 1000° C.) and under reducing conditions with carbon sources to convert the ore to a porous Fe—Cr alloy with a pre-determined content of un-burned carbon particles.

$$FeCr_2O_4+C\rightarrow Fe-Cr-C+CO+CO_2$$

Examples of suitable carbon sources include, but are not limited to, graphite, coal, activated carbon, charcoal, carbon monoxide gas, and carbon-containing materials containing carbon with oxidation state less than 4 which can remove oxygen from the chromite ore as carbon monoxide or carbon dioxide.

The Fe—Cr—C particles are crushed to a predetermined size and then dissolved in hot sulfuric acid in air to generate $FeSO_4$ and $Cr_2(SO_4)_3$. Optionally the solution is filtered to remove insoluble components.

$$Fe+Cr+H_2SO_4 \rightarrow Fe_2(SO_4)_3+Cr_2(SO_4)_3+H_2$$

Calcium chloride or barium chloride is added to the solution to remove most of the sulfate anions. The solution is filtered to remove calcium sulfate or barium sulfate and other insoluble components.

$$CaCl_2+Fe_2(SO_4)_3+Cr_2(SO_4)_3 \rightarrow CaSO_4+FeCl_3+CrCl_3$$

$$BaCl_2+Fe_2(SO_4)_3+Cr_2(SO_4)_3 \rightarrow BaSO_4+FeCl_3+CrCl_3$$

Optionally, the Cr:Fe ratio can be adjusted to achieve the final desired ratio (e.g., 3:2 Cr:Fe) by adding $FeCl_3$ or $CrCl_3$ to the solution. The solution is cooled to crystallize the $FeCl_3/CrCl_3$ mixture and remove impurities. Optionally, recrystallization can be used once or multiple times to remove impurities.

The $FeCl_3/CrCl_3$ mixture can be used as the electrolyte by adding water and reduced iron powder to generate a $FeCl_2/CrCl_3$ solution. Heat from the reaction of reduced iron and $FeCl_3$ can heat the solution if desired.

$$Fe+2FeCl_3 \rightarrow 2FeCl_2+\text{heat (approximately 168.3 kJ/mol of iron)}$$

In at least some embodiments, $H_2SO_4$ or HCl is added to the solution to produce the final electrolyte composition.

Other chromium material can also be used. Such chromium materials can include chromium waste materials, such as plating wastes, leather tanning wastes and the like (including chromium-containing materials with $Cr^{6+}$ compounds which can be first reduced by reductants such as iron power or $Fe^{2+}$ or $Cr^{3+}$ compounds). These chromium materials can be dissolved using acids, such as hydrochloric acid or sulfuric acid, to generate chromium salts. The pH of the dissolved chromium can be increased to pH>3, 5, 7, or more to produce $Cr(OH)_3$. In at least some embodiments, the choice of acid and pH can provide other chromium compounds, such as, for example:

$$Cr(OH)_3+3HCl \rightarrow CrCl_3+3H_2O$$

$$2Cr(OH)_3+3H_2SO_4 \rightarrow Cr_2(SO_4)_3+6H_2O$$

Alternatively, adding $FeCl_2$, $Fe+FeCl_3$, $Fe(OH)_2$, or $Fe+Fe(OH)_3$ in combination with HCl can produce the electrolyte composition.

Chromite ore and chromium waste materials can contain impurities, such as silica, alumina, iron, and other metals (Ni, Mn, Cu, Sb, Bi, or the like). Some of these metals can act as hydrogen generation catalysts, promoting hydrogen gas during the Fe—Cr redox flow battery operation. As described above, the metal impurities can be reduced to metal particles in the anolyte and a filter, such as filter 121 of FIG. 12, can be used to remove these particulates. In at least some embodiments, the filter 121 has a pore size in a range of 1-10 micrometers. The filter is periodically cleaned with an oxidizing solution, such as $Fe^{3+}$-containing solution or the catholyte solution of the flow battery, to dissolve these small metal particles captured by the filter, and the used clean solution is removed out of the system. The captured and removed metal cations can be recycled for further applications.

Figure 10:
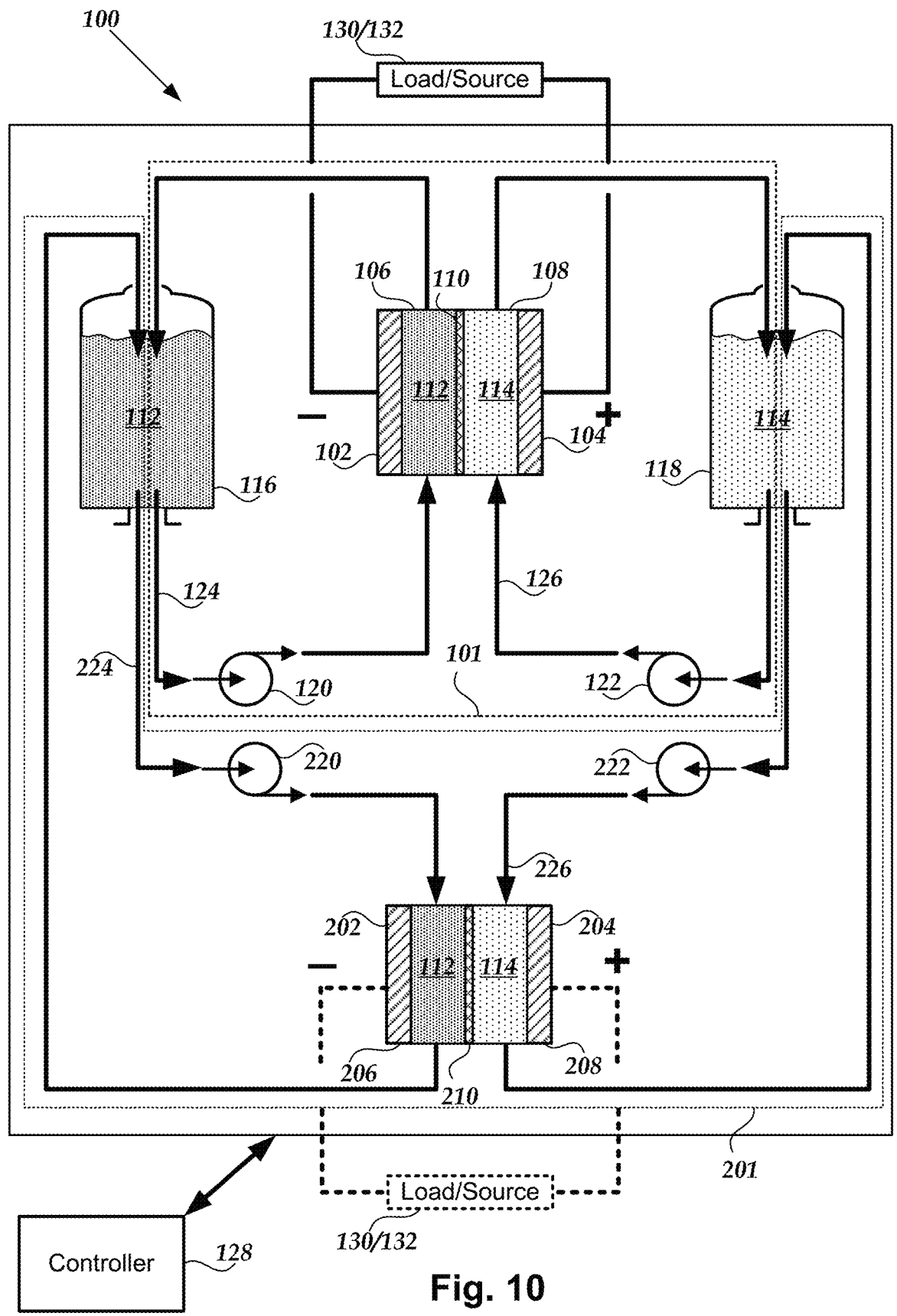
FIG. 10 is a schematic diagram of one embodiment of a redox flow battery system with a primary redox flow battery arrangement and a secondary redox flow battery arrangement, according to the invention.

In at least some embodiments, the redox battery system 100 can include a secondary redox flow battery arrangement 201 utilizing the same anolyte 112 and catholyte 114, as illustrated in FIG. 10. The secondary redox flow battery arrangement 201 includes two electrodes 202, 204, associated half-cells 206, 208, a separator 210, an anolyte pump 220, a catholyte pump 222, an anolyte distribution arrangement 224, and a catholyte distribution arrangement 226. The secondary redox flow battery arrangement 201 also includes the anolyte tank 116 and catholyte 118 used by the primary redox flow battery arrangement 101 and is operated by the same controller 128 and coupled to or coupleable to the same load/source 130/132, as illustrated in FIG. 10. (Although FIG. 10 may appear to illustrate the anolyte and catholyte tanks 116, 118 split between the primary and secondary redox flow battery arrangements 101, 201, it will be understood that the entirety of the anolyte and catholyte tanks 116, 118 are part of each of the primary and secondary redox flow battery arrangements 101, 201.)

In at least some embodiments, the secondary redox flow battery arrangement 201 has smaller half-cells 206, 208 or anolyte/catholyte pumps 220, 222 with more limited pumping capacity (or any combination of these features) than the primary redox flow battery arrangement 101. In at least some embodiments, the ratio of peak power delivery capacity of the secondary redox flow battery arrangement 201 to the peak power delivery capacity of the primary redox flow battery arrangement 101 is in a range of 1:5 to 1:200 or in a range of 1:1.1 to 1:10 or in a ratio of 1:1.5 to 10. In at least some embodiments, a peak power delivery capacity of the secondary redox flow battery arrangement is less than a peak power delivery capacity of the primary redox flow battery arrangement.

In at least some embodiments, the secondary redox flow battery arrangement 201 can be used to supplement the primary redox flow battery arrangement 101 during periods of high-power delivery by placing the second redox flow battery arrangement 201 in a series or parallel configuration with respect to the load 130.

In at least some embodiments, the secondary redox flow battery arrangement 201 can be used to replace the primary redox flow battery arrangement 101 during periods of low power delivery to provide periods of time when the primary redox flow battery arrangement 101 is not operational or is in a quiescent state. The secondary redox flow battery arrangement 201 continues to use the same anolyte/catholyte 112, 114 to discharge these electrolytes and reduce or prevent self-discharge or overheating during periods of nonoperation of the primary redox flow battery arrangement 101. In at least some embodiments, the secondary redox flow battery arrangement 201 can be used to restart the primary redox flow battery arrangement 101.

In at least some embodiments, the controller 128 is configured to switch from the primary redox flow battery arrangement 101 to the secondary redox flow battery arrangement 201 when the discharge power being drawn is no more than a first predefined level. In at least some embodiments, the controller 128 is configured to switch from the secondary redox flow battery arrangement 201 to the first redox flow battery arrangement 101 when the discharge power being drawn is at least a second predefined level. In at least some embodiments, the first and second predefined level are the same. In other embodiments, the second predefined level is greater than the first predefined level. In at least some embodiments, the controller 128 is configured to add the secondary redox flow battery arrangement 201 to the first redox flow battery arrangement 101 when the discharge power being drawn is at least a third predefined level.

In at least some embodiments, the secondary redox flow battery arrangement 201 can be used as a stand-by power source. In at least some embodiments, when the primary redox flow battery arrangement 101 is to be placed in a quiescent or non-operational state, the electrolyte 112, 114 in the half-cells 106, 108 of the primary redox flow battery arrangement can be discharged (for example, to avoid damage to the primary redox flow battery arrangement) by coupling the secondary redox flow battery arrangement 201 to the primary redox flow battery arrangement as a load 130. In at least some embodiments, the anolyte and catholyte pumps 120, 122 are halted or pumping relatively slowly during this process because the objective is simply to discharge the electrolyte 112, 114 in the half-cells 106, 108. Conversely, when the secondary redox flow battery arrangement 201 is to be placed in a quiescent or non-operational state, the electrolyte 112, 114 in the half-cells 206, 208 of the secondary redox flow battery arrangement can be discharged by coupling the primary redox flow battery arrangement 201 to the secondary redox flow battery arrangement as a load 130.

It will be recognized that a redox flow battery system can include one or more primary redox flow battery arrangements 202 and one or more secondary redox flow battery arrangements 201. It will be recognized that one or more second redox flow battery arrangements 201 can be incorporated in any of the other embodiments described herein and that any of the modifications described herein for a redox flow battery system can also be applied to the secondary redox flow battery arrangement 201.

Figure 11:
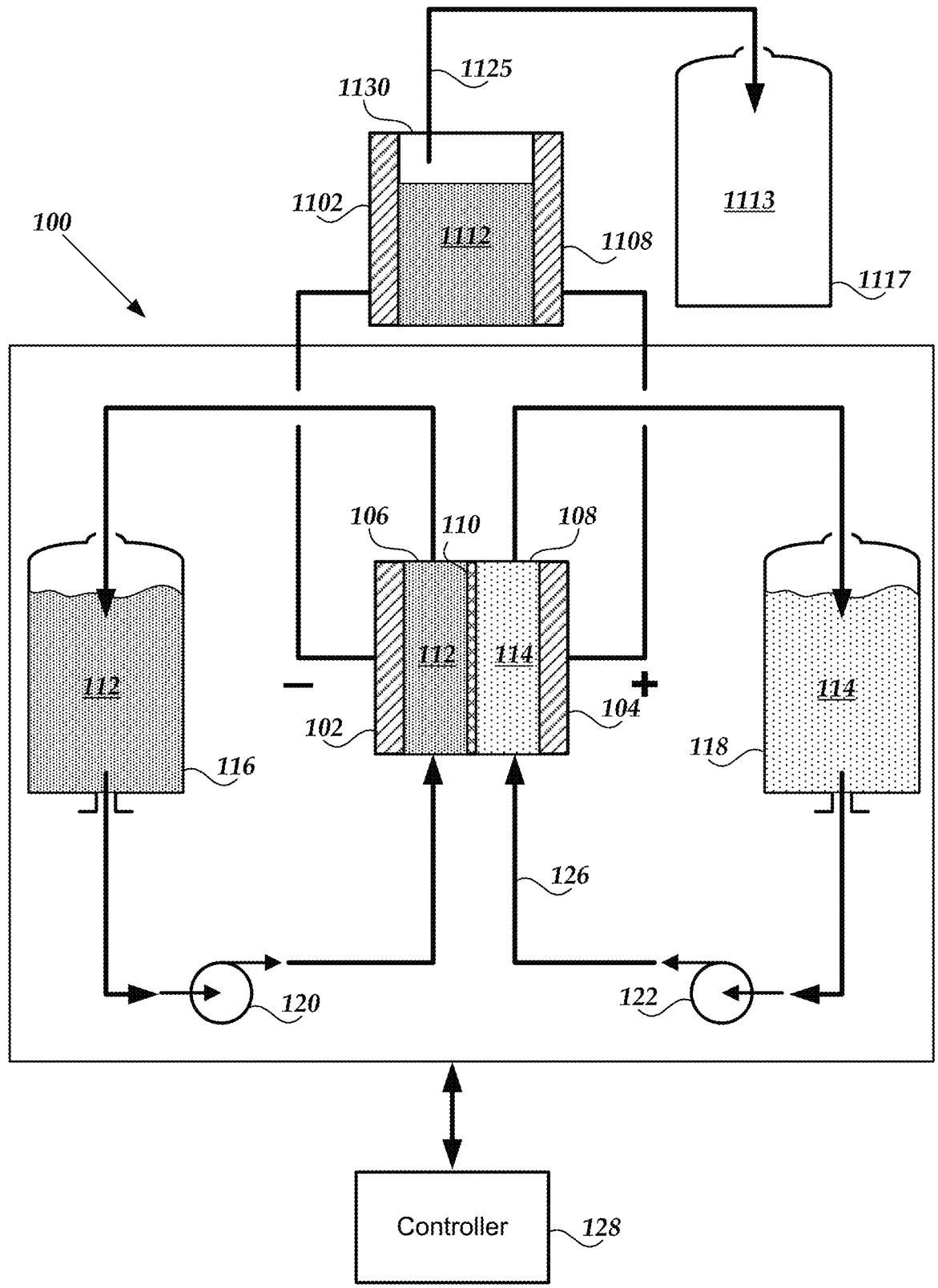
FIG. 11 is a schematic diagram of one embodiment of a redox flow battery system coupled to an electrolysis cell for production of hydrogen gas, according to the invention.

The redox flow battery can be used for the production of hydrogen by electrolysis of water 1112 in an electrolysis cell 1130 attached to the redox cell battery system 100, as illustrated in FIG. 11. The electrolysis cell 1130 includes electrodes 1102, 1108 and a hydrogen removal arrangement 1125 delivers the hydrogen gas 1113 generated by electrolysis of water in the electrolysis cell 1130 to a hydrogen gas storage tank 1117. Separation of the hydrogen gas 1113 from oxygen gas is known and can be performed using any suitable method.

The redox flow battery system 100 provides a convenient and useful mechanism for generating hydrogen gas. The redox flow battery system 100 can be charged and then used to electrolyze water in the electrolysis cell 1130. In contrast to many conventional arrangements for hydrogen product that require converting AC power to DC power to hydrolyze water, the redox flow battery system 100 inherently generates DC power which can be sufficient to hydrolyze the water to generate hydrogen gas.

Alternatively or additionally, in at least some embodiments, hydrogen gas 1113 is a byproduct of operation of the redox flow battery system 100. A hydrogen removal arrangement (similar to hydrogen removal arrangement 1125) delivers the hydrogen gas 1113 generated in either the first or second half cells 106, 108 to the hydrogen gas storage tank 1117. This byproduct of the charging of the redox flow battery system 100 can be sold as an additional product.

Figure 13:
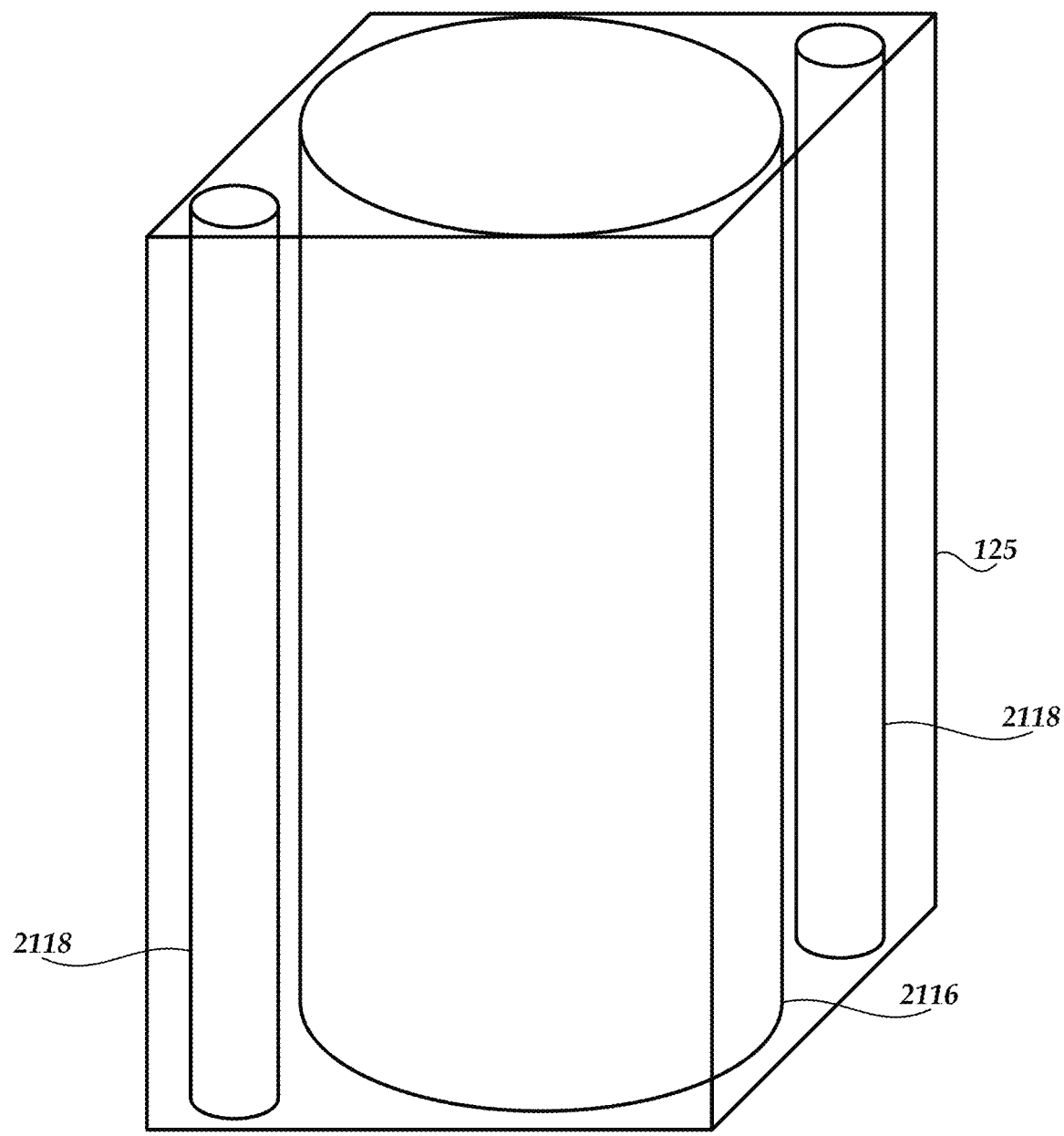
FIG. 13 is a schematic perspective illustration of multiple electrolyte tanks disposed in a storage region.

In at least some embodiments, the anolyte/catholyte tanks 116, 118 can each be a set of tanks. For example, in at least some embodiments, the anolyte/catholyte tanks 116, 118 each include a primary electrolyte tank 2116 and one or more supplemental electrolyte tanks 2118, as illustrated in FIG. 13. In at least some embodiments, the primary electrolyte tank 2116 is cylindrical, as illustrated in FIG. 13, as opposed to being a cube or rectangular cuboid. In at least some embodiments, a cube or rectangular cuboid is prone to leakage, particularly for relatively large tanks, whereas a cylindrical tank is less likely to leak.

In at least some embodiments, a tank storage region 125 for a redox flow battery system may be a rectangular cuboid, as illustrated in FIG. 13, or another non-cylindrical shape. A cylindrical primary electrolyte tank 2116 may not fill the tank storage region 125, as illustrated in FIG. 13. To provide additional electrolyte storage, one or more (for example, one, two, three, four, five, six, or more) supplemental electrolyte tanks 2118 can be included in the tank storage region 125. The supplemental electrolyte tanks 2118 can be connected in series or parallel to the primary electrolyte tank 2116. The supplemental electrolyte tanks 2118 can be cylinders, cubes, rectangular cuboids, or any other suitable shape. Concerns with leakage (or the likelihood of leakage) may be lower if the supplemental electrolyte tanks 2118 have a substantially smaller volume (for example, no more than 5, 10, or 25%) than the primary electrolyte tank 2116. The supplemental electrolyte tanks 2118 can all have the same shape or volume or can have different shapes or volumes.

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent is:

1. A method for preparation of electrolyte for a redox flow battery, the method comprising:
   reducing chromium ore using a carbon source to convert the chromium ore to an iron/chromium alloy with carbon particles;
   dissolving the iron/chromium alloy with carbon particles in sulfuric acid to form a first solution;
   adding calcium chloride or barium chloride to the first solution to produce a second solution comprising $FeCl_3$ and $CrCl_3$; and
   adding an acid to the second solution to form the electrolyte.

2. The method of claim 1, wherein the chromium ore comprises at least one metal impurity and the method further comprises
   reducing the at least one metal impurity in the electrolyte using an electrode of the redox flow battery to form particles of the at least one metal impurity;
   collecting the particles of the at least one metal impurity; and
   removing the collected particles using a cleaning solution.

3. The method of claim 2, wherein collecting the particles comprises collecting at least a portion of the particles on an electrode of the redox flow battery system.

4. The method of claim 3, wherein the electrode comprises interdigitated openings or indentations for collection of the particles.

5. The method of claim 2, wherein the at least one metal impurity comprises at least one of nickel, antimony, bismuth, zinc, platinum, palladium, gold, or copper.

6. The method of claim 2, wherein the cleaning solution comprises ferric ions.

7. The method of claim 2, wherein the cleaning solution is at least a portion of a catholyte of the redox flow battery system.

8. The method of claim 2, wherein the cleaning solution comprises hydrogen peroxide or ferric chloride.

9. The method of claim 1, wherein the carbon source comprises graphite, activated carbon, coal, charcoal, or carbon monoxide gas.

10. The method of claim 1, further comprising adding $FeCl_3$ or $CrCl_3$ to obtain a preselected ratio of $FeCl_3/CrCl_3$ in the electrolyte.

\* \* \* \* \*